United States Patent
Beach et al.

[11] Patent Number: 5,953,017
[45] Date of Patent: Sep. 14, 1999

[54] COMPRESSED OBJECT DISPLAY

[75] Inventors: Mark John Beach, Altura; Brian John Cragun, Rochester, both of Minn.

[73] Assignee: International Business Machines Corporation, Armonk, N.Y.

[21] Appl. No.: 08/904,004

[22] Filed: Jul. 31, 1997

[51] Int. Cl.[6] ................................................. G06F 15/00
[52] U.S. Cl. ................................................. 345/440
[58] Field of Search ................................ 345/440, 441, 345/356, 357, 118, 121

[56] References Cited

U.S. PATENT DOCUMENTS

| | | | |
|---|---|---|---|
| 5,065,347 | 11/1991 | Pajak et al. | 395/159 |
| 5,442,795 | 8/1995 | Levine et al. | 395/800 |
| 5,515,487 | 5/1996 | Beaudet et al. | 395/140 |
| 5,704,028 | 12/1997 | Schanel et al. | 395/140 |

OTHER PUBLICATIONS

Microsoft Corporation, "Microsoft Windows 95 Introduction", 1995, pp. 71 and 76.
Que Corporation, "Using OS/2 2.0", 1992, pp. 164 and 165.

*Primary Examiner*—Phu K. Nugyen
*Attorney, Agent, or Firm*—Owen J. Gamon

[57] ABSTRACT

A display-object manager that manages a display of object identifiers on a display screen. The object identifiers are organized in a tree structure, and represent objects. The display-object manager displays the object identifiers and then selects a subset of the object identifiers to compress. All members of the subset are siblings in the tree structure, and their parent has additional children that are not in the subset. The display-object manager replaces the display of the subset with a new identifier that represents the subset.

47 Claims, 22 Drawing Sheets

```
┌─────────────────────────────────────────────────┬───┐
│ −                                               │∧│∨│
├─────────────────────────────────────────────────┴─┬─┤
│     File      Criteria      Options               │ │
├───────────────────────────────────────────────────┤ │
│                                 Compression Threshold│
│                  Maximum Lines  Minimum      Maximum│
│                  ┌──────────┐   ├──────┬──────────┤│
│                  └──────────┘          ╨           ││
├──────────────────────────────────────────────────┬─┤
│        ⊞-☐ Building a Barn                       │∧│
│        ⊞-☐ Building a Cabin                      │ │
│        ⊞-☐ Building a Deck                       │ │
│        ⊞-☐ Building a Dream Home                 │ │
│        ⊞-☐ Building a Dream House                │ │
│        ⊞-☐ Building a Fence                      │ │
│        ⊞-☐ Building a Fortress                   │ │
│        ⊞-☐ Building a Garage                     │ │
│        ⊞-☐ Building a Gazebo                     ├─┤
│        ⊟-📖 Building a Geodesic Dome              │ │
│           ├ ⊡ 1: Selecting a site                │ │
│           ├ ⊡ 2: Digging the site                │ │
│           └ ⊡ 3: Laying the foundation           │ │
│           ├ ⊡ 4: Floor                           │ │
│           ├ ⊡ 5: Walls                           │ │
│           ├ ⊡ 6: Dome                            │ │
│           ├ ⊡ 7: Cupulas                         │ │
│           ├ ⊡ 8: Heating                         │ │
│           ├ ⊡ 9: Windows                         │ │
│           ├ ⊡ 10: Electricity                    │ │
│           ├ ⊡ 11: Plumbing                       │ │
│           ├ ⊡ 12: Sheet rock & taping            │∨│
├───┬───────────────────────────────────────────┬──┴─┤
│ < │                   /                       │  > │
└───┴───────────────────────────────────────────┴────┘
```

FIG. 4

COMPRESSED OBJECT DISPLAY

FIELD OF THE INVENTION

The present invention relates to a method and a system for data processing, and in particular to a data processing system and method for displaying a hierarchical organization of objects in a tree view.

BACKGROUND

A tree view is a popular and useful graphical method for displaying on a display screen the hierarchical organization of objects, such as files, in computer memory. A tree view takes its name from an analogy to trees in nature, which have a hierarchical organization of branches and leaves. For example, a leaf belongs to a small branch, which further belongs to a large branch, and all branches of the tree have a common starting point at the root.

Analogously, objects in computer memory can have a hierarchical organization, in that an object can be contained in a sub-directory, which can be further contained in another directory, and so on. Thus, all of computer memory can be divided up into sub-directories and directories that ultimately are all contained in a root directory. The structure of the displayed tree view shows both nesting of objects and where the objects belong within the nested hierarchical organization.

Unfortunately, such tree views can become cumbersome when the list of objects is large. It might take several scrolling operations by the user to page through a large tree before finding a desired object, and the user can easily become lost. Thus, one of the biggest advantages of a tree display—that the user has an orientation to where the objects are located—can become confusing when there are too many objects.

Prior file managers attempted to address this problem by providing the function of taking infrequently used objects at a displayed, expanded level of the tree and un-expanding (collapsing) them into a visual set, leaving the visual set in its respective position. This allowed the user to see more of the important information, without totally removing the objects, thus preserving the advantages of a tree view. In prior file managers, an entire branch of the tree is shown in its expanded form or hidden in its collapsed form. The branch of the tree is often a directory or subdirectory, and the name that the file manager often associates with the collapsed form is the name of the directory or subdirectory that contains the collapsed (unexpanded) objects.

Prior file managers suffer from the problem that they could only expand and collapse entire branches. Although this works well when a branch had a small number of objects, as the number of objects in a branch increases, it becomes increasingly difficult for the user to find a desired object and maintain an orientation within the tree.

SUMMARY OF THE INVENTION

It is therefore one object of the present invention to provide an improved method and system for data processing.

It is another object of the present invention to provide an improved data-processing system and method for displaying a collection of objects.

It is another object of the present invention to provide an improved data-processing system and method for compressing and uncompressing a hierarchical collection of objects.

In the preferred embodiment, a display-object manager manages a display of object identifiers on a display screen. The object identifiers are organized in a tree structure, and represent objects. The display-object manager displays the object identifiers and then selects a subset of the object identifiers to compress. All members of the subset are siblings in the tree structure, and their parent has additional children that are not in the subset. The display-object manager replaces the display of the subset with a new identifier that represents the subset.

BRIEF DESCRIPTION OF THE DRAWINGS

FIG. 4 illustrates an example screen showing a collection of objects prior to the compression operation of the preferred embodiment.

DESCRIPTION OF THE PREFERRED EMBODIMENT

Technology Overview

Tree views are a popular and useful graphical method for displaying on a display screen the hierarchical organization of objects in computer memory. A tree view takes its name from an analogy to trees in nature, which have a hierarchical organization of branches and leaves. For example, a leaf belongs to a small branch, which further belongs to a large branch, and all branches of the tree have a common starting point at the root.

Analogously, objects in computer memory can have a hierarchical organization, in that an object can be contained in a sub-directory, which can be further contained in another directory, and so on. Thus, all of computer memory can be divided up into sub-directories and directories that ultimately are all contained in a root directory. The structure of the displayed tree view shows both nesting of objects and where the objects belong within the nested hierarchical organization.

Objects can be a wide variety of computer entities, such as files, directories, subdirectories, folders, databases, and executable programs. An object identifier identifies the object in the displayed tree view. An object identifier might include, for example, the name of the object, physical characteristics of the object (perhaps its size, creation date, or last-access date), and/or an icon that symbolizes the object.

A tree structure defines the hierarchical organization of objects. A tree can be defined as a finite set, T, of one or more objects, such that a) there is one specially designated object called the root of the tree; and b) the remaining objects (excluding the root) are partitioned into m>=0 disjoint sets T1, ... Tm, and each of these sets is in turn a tree. The trees T1, ..., Tm are called the subtrees of the root. Thus, every object in a tree is the root of some subtree contained in the whole tree. The number of subtrees of an object is called the degree of that object. An object of degree zero is called a terminal object or a leaf. A nonterminal object is called a branch object. The level of an object with respect to T is defined by saying that the root has level 0, and other objects have a level that is one higher than they have with respect the subtree that contains them. Each root is the parent of the roots of its subtrees, and the latter are siblings, and they are also the children of their parent. The root of the entire tree has no parent.

DETAILED DESCRIPTION

Figure 1:
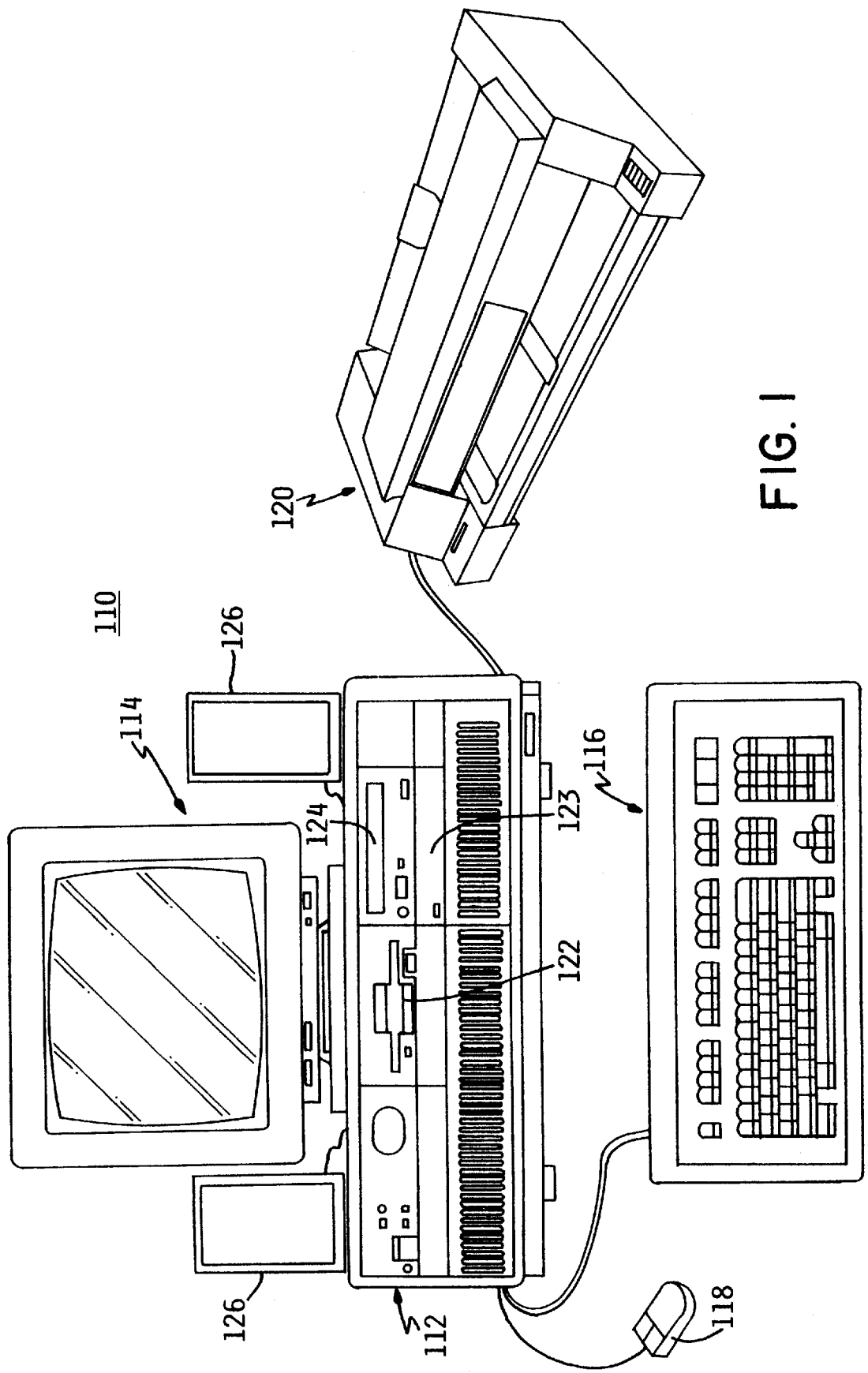
FIG. 1 illustrates a pictorial representation of a data processing system that can be utilized to implement the preferred embodiment.

With reference now to the figures and in particular with reference to FIG. 1, there is depicted an embodiment of a data-processing system that may be utilized to implement the preferred embodiment. Data-processing system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although data-processing system 110 is illustrated with a mouse for pointing device 118, other graphical-pointing devices such as a graphic tablet, joystick, track ball, or track pad could also be utilized.

To support storage and retrieval of data, processing unit 112 further includes diskette drive 122, hard-disk drive 123, and CD-ROM drive 124, which are interconnected with other components of processing unit 112. While a particular hardware configuration is described herein along with various alternatives, the methods described could in general be practiced using any hardware configuration that allows the display of a hierarchical collection of objects.

Figure 2:
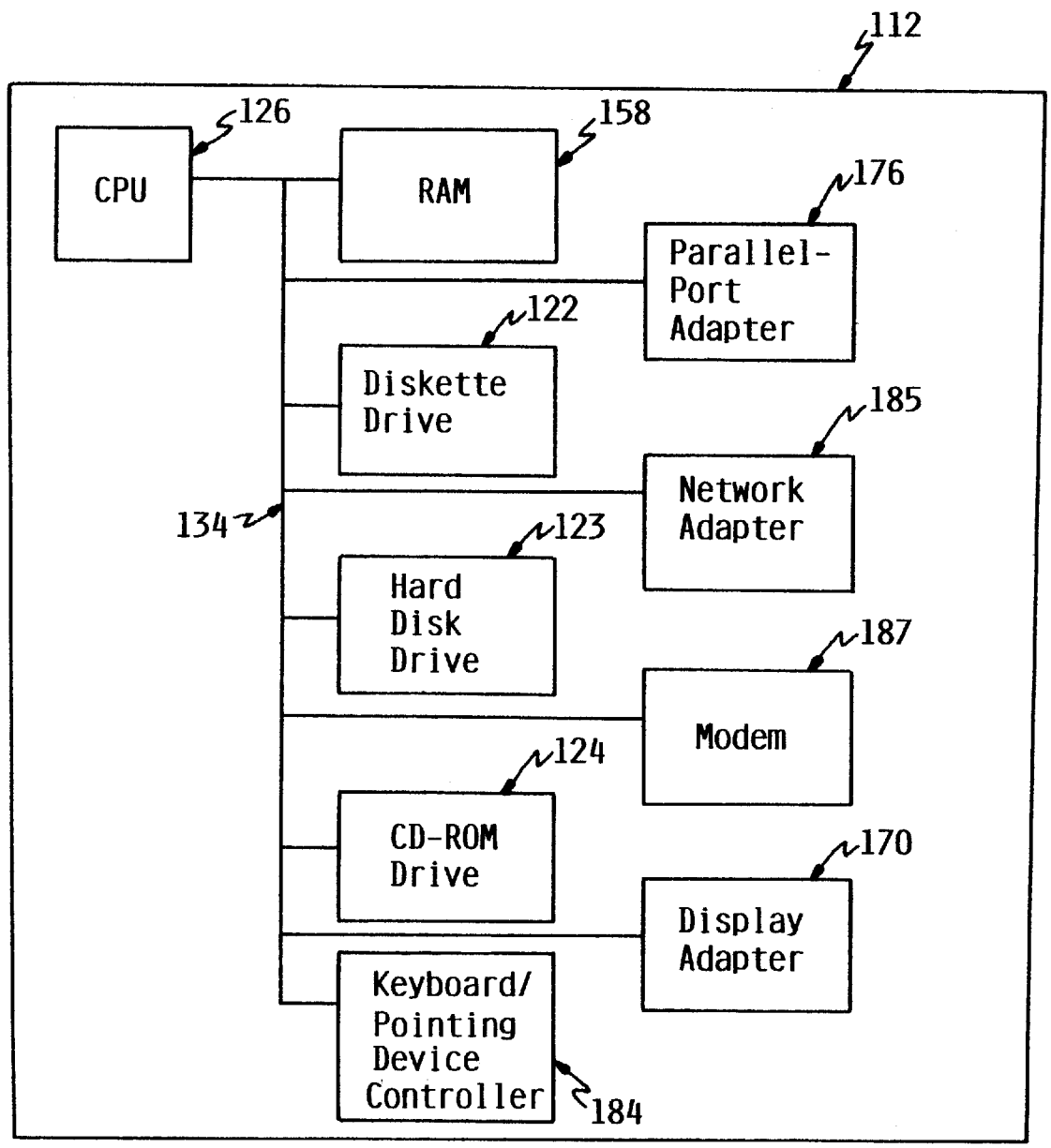
FIG. 2 illustrates a more detailed block diagram representation of the processing unit of the data-processing system shown in FIG. 1.

Referring to FIG. 2, there is depicted a block diagram of the principal components of processing unit 112. CPU 126 is connected via system bus 134 to RAM 158, diskette drive 122, hard-disk drive 123, CD-ROM drive 124, keyboard/pointing-device controller 184, parallel-port adapter 176, network adapter 185, display adapter 170 and modem 187. Although the various components of FIG. 2 are drawn as single entities, each may consist of a plurality of entities and may exist at multiple levels.

Processing unit 112 includes central processing unit (CPU) 126, which executes software instructions. While any appropriate processor can be utilized for CPU 126, CPU 126 is preferably one of the Power PC line of microprocessors available from IBM. Alternatively, CPU 126 can be implemented as one of the 80X86 or Pentium processors, or any other type of processor, which are available from a number of vendors. CPU 126 accesses data and instructions from and stores data to volatile random access memory (RAM) 158.

RAM 158 comprises a number of individual volatile memory modules that store segments of operating system and application software while power is supplied to data-processing system 110. The software segments are partitioned into one or more virtual memory pages that each contain a uniform number or virtual memory addresses. When the execution of software requires more pages of virtual memory that can be stored within RAM 158, pages that are not currently needed are swapped with the required pages, which are stored within non-volatile storage devices 122, 123, or 124.

Keyboard/pointing-device controller 184 interfaces processing unit 112 with keyboard 116 and graphical-pointing device 118. In an alternative embodiment, there is a separate controller for keyboard 116 and graphical-pointing device 118.

Display adapter 170 translates graphics data from CPU 126 into video signals utilized to drive display device 114.

Finally, processing unit 112 includes network-adapter 185, modem 187, and parallel-port adapter 176, which facilitate communication between data-processing system 110 and peripheral devices or other data processing systems. Parallel-port adapter 176 transmits printer-control signals to printer 120 through a parallel port. Network-adapter 185 connects data-processing system 110 to an unillustrated local area network (LAN). A LAN provides a user of data-processing system 110 with a means of electronically communicating information, including software, with a remote computer or a network logical-storage device. In addition, a LAN supports distributed processing, which enables data processing system 110 to share a task with other data processing systems linked to the LAN.

Modem 187 supports communication between data-processing system 110 and another data-processing system over a standard telephone line. For example, modem 187 may be utilized to connect data-processing system 110 to an on-line information service, such as provided by Prodigy Services Corporation under the service mark "PRODIGY." Such an on-line service provides software that can be downloaded into data-processing system 110 via modem 187. Furthermore, through modem 187, data-processing system 110 can access other sources of software such as a server, an electronic bulletin board, and the Internet or World Wide Web.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
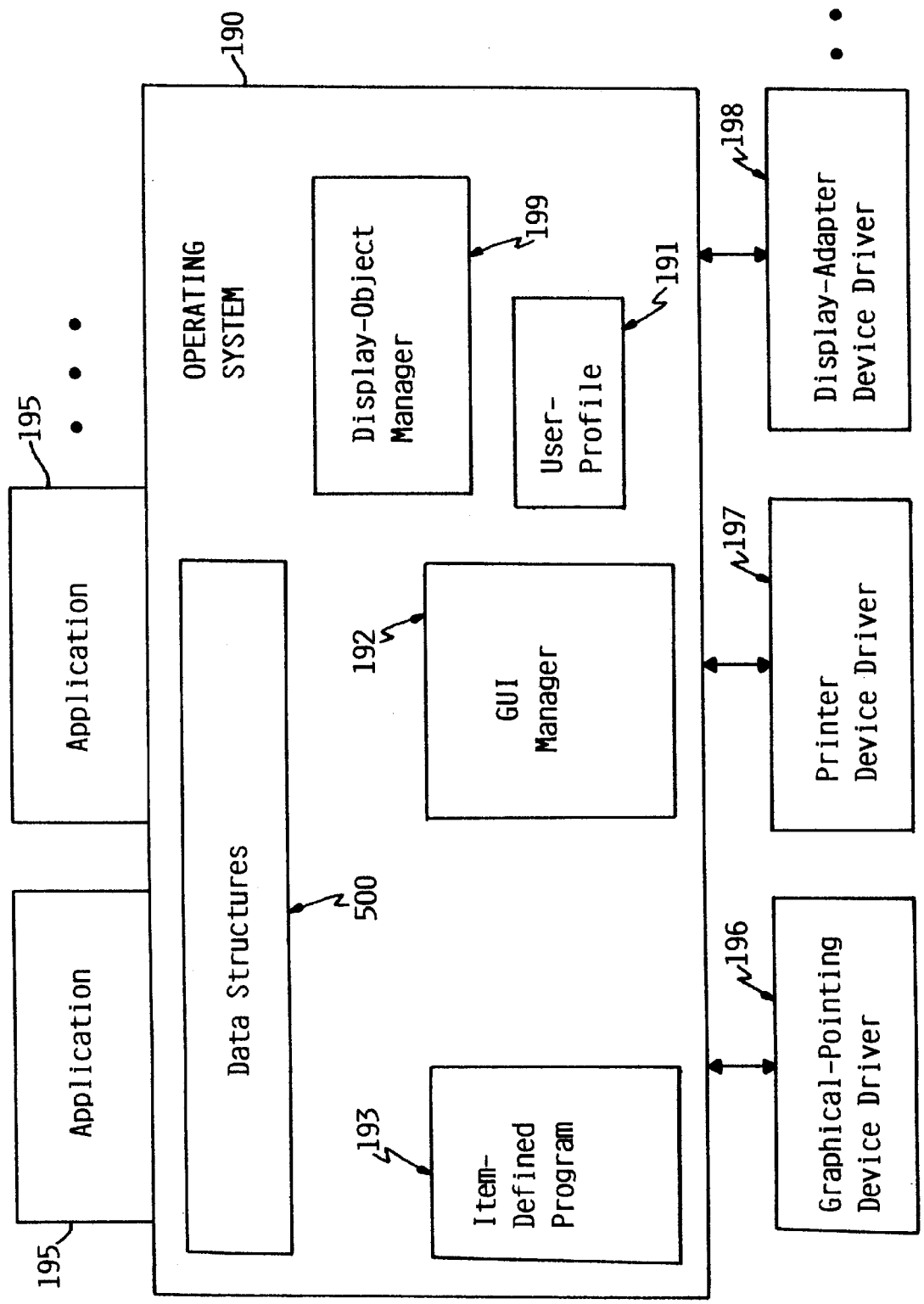
FIG. 3 illustrates a block diagram representation of a display-object manager and other software stored within the memory of the data processing system depicted in FIG. 1.

With reference now to FIG. 3, there is illustrated a block-diagram representation of the software configuration of data-processing system 110 in accordance with the preferred embodiment. As noted above, the software executed by data-processing system 110 can be stored within one or more of RAM 158, the nonvolatile storage provided by diskette drive 122, hard-disk drive 123, CD-ROM drive 124, or a remote server accessible via modem 187 or network-adapter 185. As illustrated, the software configuration of data-processing system 110 includes operating system (OS) 190, which is responsible for managing the allocation uses of data-processing system 110, for example, by assigning CPU time to various execution threads and allocating portions of RAM 158 for use by various user applications 195.

In accordance with the preferred embodiment, OS 190 includes graphical-user-interface (GUI) 192 manager, display-object manager 199, data structures 500, item-defined program 193, and user-profile 191. Although the various components of operating system 190 are shown as being separate entities, they could in fact be packaged as one entity. In addition, GUI 192, display-object manager 199, data structures 500, item-defined program 193, and user-profile 191 could be packaged separately from OS 190. GUI 192 manages the graphical-user-interface with which a user of data-processing system 110 interacts. Display-object manager 199 manages the display of objects on display device 114. The operation of display-object manager 199 is further described under the description for FIGS. 11–16. User-profile 191 contains user-selected options for compressing collected-objects. User-profile 191 is further described under the description for FIGS. 6 and 11. Item-defined program 193 is a user-supplied program that supplies a compression criteria, which display-object manager 199 will use, as further described under the description for FIG. 6 and FIG. 11, below.

OS 190 communicates with applications 195 through messages conforming to the syntax of the application program interface (API) supported by OS 190. OS 190 further communicates with graphical-pointing device-driver 196 and display-adapter device 198. For example, OS 190 sends graphics data that specify display parameters in context to display-adapter device 198, which in turn translates the messages into bus signals utilized to control display-adapter 170. In addition, graphical-pointing device-driver 196 translates signals from pointing device 118 through keyboard/pointing-device controller 184 into Cartesian coordinates and a selection status, which are then relayed to GUI manager 192.

CPU 126 is suitably programmed to carry out the preferred embodiment by GUI manager 192 and display-object manager 199, as described in more detail in the flowcharts of FIGS. 11–16. In the alternative, the function of FIGS. 11–16 could be implemented by control circuitry through the use of logic gates, programmable-logic devices, or other hardware components in lieu of a processor-based system.

FIG. 4 illustrates an example screen on display 114 showing a set of objects in a hierarchical tree view prior to the compression operation of the preferred embodiment. In this example, the objects are directories in an encyclopedia that relate to construction. The collapsed directories start with "Building a Barn" and continue through the directory "Building a Gazebo". The next directory is "Building a Geodesic Dome", which has been expanded to show its subdirectories, which on the displayed screen start with "1: Selecting a Site" and continue through "12: Sheet Rock and Taping." Objects typically are directories, file folders, or documents that in turn may contain other objects. For example, a directory or file folder may contain several documents, or other directories of file folders.

The representation and display of objects may take several forms. In order to maintain an uncluttered display area in the window, it may be useful to provide a miniature representation of the object, such as an icon, when a user is not engaging in activities related to the object. In this example all of the collapsed directories have an icon with a "+" to indicate that this directory is collapsed. In contrast, the expanded directory has an icon with a "−" to indicate that it is expanded.

Figure 5:
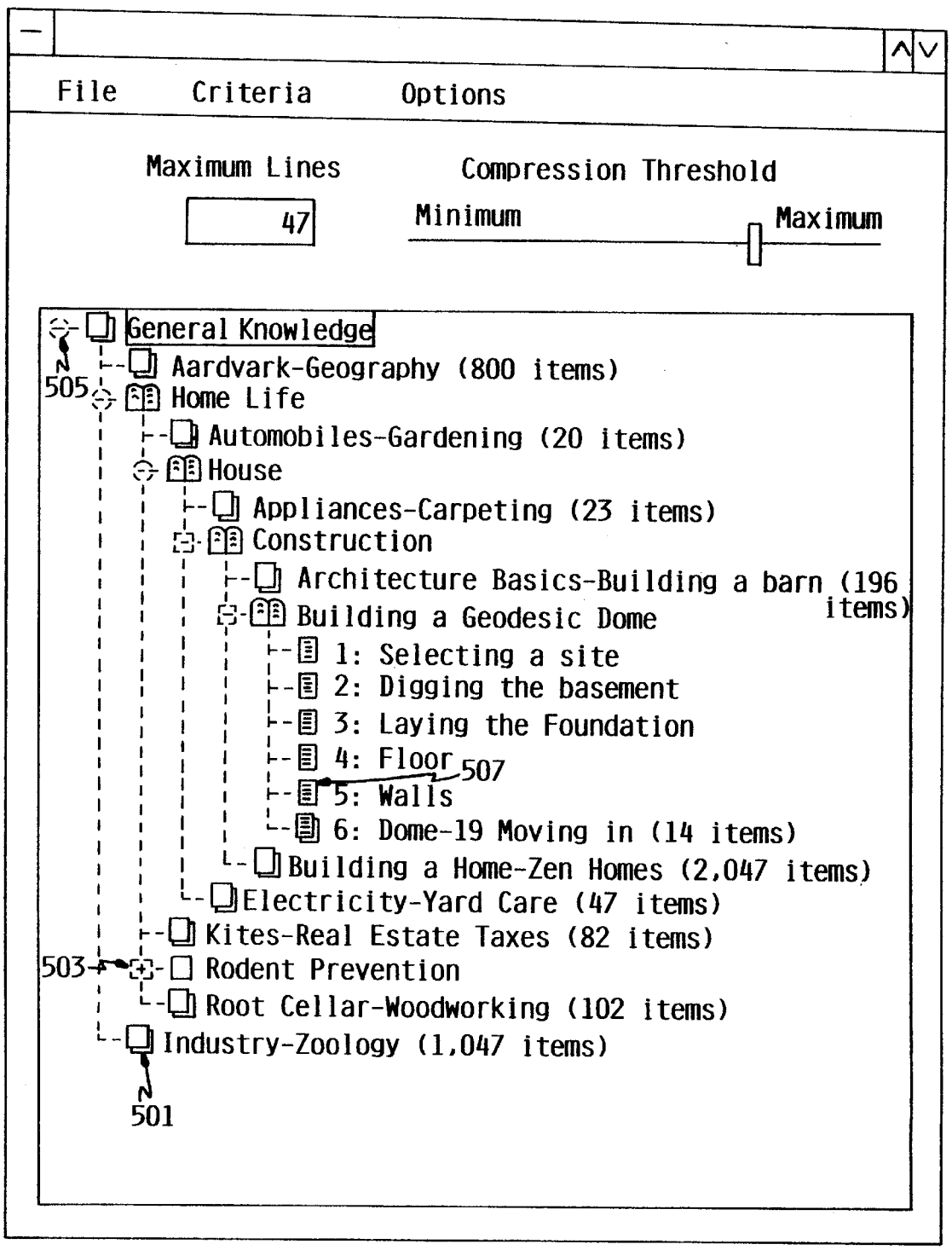
FIG. 5 illustrates the displaying of a collection of objects during operation of the preferred embodiment.

FIG. 5 illustrates an example of the display of a collection of objects as compressed by operation of display-object manager 199 in the preferred embodiment. Display-object manager 199 has compressed the display of object identifier "6: Dome" through object identifier "19: Moving In" into one new identifier shown as: "6: Dome - 19: Moving In (14 items)". Thus, in this example, display-object manager 199 has compressed a subset of 14 items into I item. Similarly, display-object manager 199 has compressed a subset of 800 items into 1 item as "Aardvark-Geography (800 items)", has compressed a subset of 20 items into 1 item as "Automobiles-Gardening (20 items)", has compressed a subset of 23 items into 1 item as "Appliances-Carpeting (23 items)", has compressed a subset of 196 items into one item as "Architecture Basics-Building a barn (196 items)", has compressed a subset of 2,047 items into 1 item as "Building a Home-Zen Homes (2,047 items)", has compressed a subset of 47 items into 1 item as "Electricity-Yard Care (47 items)", has compressed a subset of 82 items into 1 item as "Kites-Real Estate Taxes (82 items)", has compressed a subset of 102 items into 1 item as "Root Cellar-Woodworking (102 items)", and has compressed a subset of 1,047 items into 1 item as "Industry-Zoology (1,047 items)". In these examples, the newly created identifier is a concatenation of the first identifier in the compressed subset, the last identifier in the compressed subset, and the number of objects in the compressed subset.

These compression operations of multiple items into 1 item are different from the collapsing of items in that compression compresses a partial branch of the hierarchical object display. That is, the multiple items being compressed into one item all have a common parent and are thus siblings. Further, the common parent has at least one additional child that is not part of the subset. Icons, such as icons 501, 503, and 505, represent each line and inform the user whether this line has compressible or expandable entries. A "+", such as icon 503, means that this item has been collapsed and is thus expandable. A "−" means that this item has been expanded and thus can be collapsed. A dual icon with two overlapping pages, such as icon 501, means that this item has been compressed and thus can be uncompressed. A single-page icon, such as icon 507, means this item is not compressed and cannot be further expanded.

Figure 6:
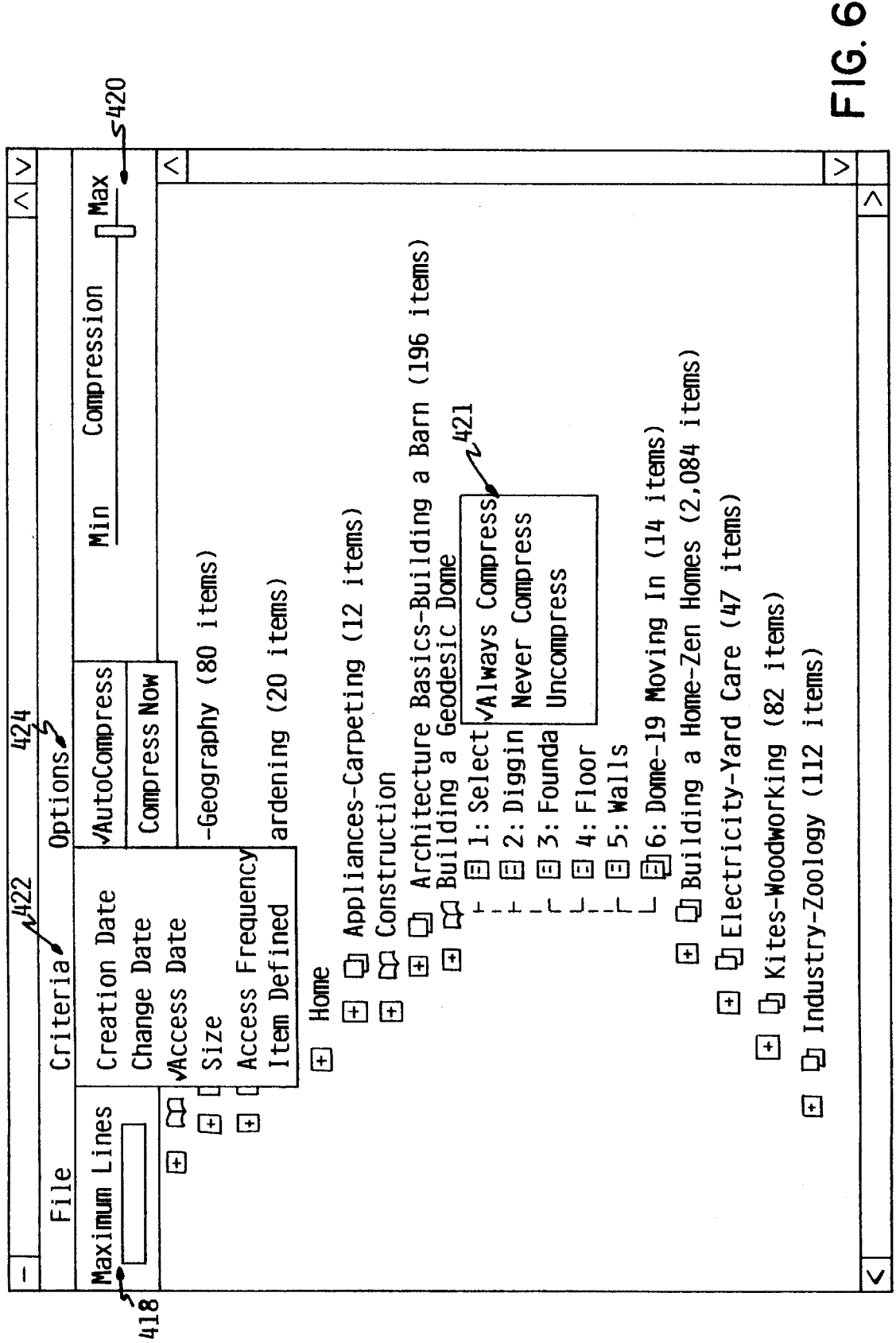
FIG. 6 illustrates the interfaces that are used to control the operation of the preferred environment.

FIG. 6 illustrates the user-control constructs that display-object manager 199 uses to control the operation of the preferred environment. The control constructs shown in FIG. 6 are criteria-controls 422, options 424, maximum number-of-lines 418, threshold-slide 420, and compression-control 421. Display-object manager 199 displays compression-control 421 to the user when the user selects an item or items (via dragging pointing-device 118 in the preferred embodiment) on the display of FIG. 6 and then depresses the right mouse button (in the preferred embodiment). Display-object manager 199 displays the menu items for criteria-controls 422 when the user selects "criteria" on the display via pointing device 118, in the preferred embodiment. Display-object manager 199 displays the menu for options 424 when the user selects "options" via pointing device 118, in the preferred embodiment. The user may enter a value for maximum number-of-lines 418 by selecting its associated input field via pointing device 118, and then entering a value via keyboard 116. The user may input a value for threshold-slide 420 by positioning pointing device 118 over the slide, depressing the left mouse button, and dragging the slide either left or right, in the preferred embodiment. Display-object manager 199 stores the control constructs that the user selects into user-profile 191.

Compression-control 421 contains the values "always compress", "never compress", and "uncompress". The contents of compression-control 421 are context sensitive: meaning that the contents will change based on the item or items selected. For example, the "uncompress" option will only be displayed in compression-control 421 for an item that was already compressed. The processing that occurs when the user selects an item or items and then selects an option from compression-control 421 is further described under the description for FIG. 12, below.

Criteria-control 422 contains the various compression criteria that the user can select to control the compression that display-object manager 199 will do. Options "creation date", "change date", "access date", "size", "access frequency", and "item defined" are shown. Creation date is the date that the item was created. Change date is the date that the item was last changed. Access date is the date that the item was last accessed or read. Size is the size of the item. Access frequency is the number of times that the item has been accessed since it was created. Item defined refers to a user-selected criteria, and the user selection of "item defined" causes display-object manager 199 to invoke item-defined program 193, as further described under the description for FIG. 11, below. Selecting one of criteria-control options 422 causes display-object manager 199 to compress the items using this criteria, as further described under the description for FIG. 11, below.

Referring again to FIG. 6, options 424 contains "auto compress" and "compress now". The "auto compress" action causes display-object manager 199 to do a compression operation after each user action. Once "auto compress" is turned on, display-object manager 199 continues to do compression until "auto compress" is turned off. The "compress now" action causes display-object manager 199 to do a single compression operation immediately. The processing for "auto compress" and "compress now" is further described under the description for FIGS. 11 and 13, below.

Referring again to FIG. 6, threshold-slide 420 is used by display-object manager 199 in order to determine how much compression to do, as will be described below under the description for FIG. 14. The value of slider 420 is scaled to zero for the minimum and 100 for the maximum, in the preferred embodiment. Slider 420 is related to criteria 422 as follows: display-object manager 199 will compress all those items that have a criteria falling between the minimum possible criteria value and the setting of slider 420. The minimum for the creation date is the oldest date and time on the system, and the maximum is the current date and time. The minimum change date is the oldest date and time for any item on the system, and the maximum change date is the current date and time. The minimum access date is the oldest access date and time for any item on the system, and the maximum access date is the current date and time. The minimum size is the size of the smallest item on the system, and the maximum size is the size of the largest item on the system. A minimum access frequency is the least number of accesses for any item on the system, and the maximum access frequency is the most accesses for any item on the system. The minimum item-define value and the maximum item-define value vary according to the item-defined value set by the user.

Maximum number-of-lines 418 is the maximum number-of-lines that the user would like to see at one time. Maximum number-of-lines 418 is used by display-object manager 199 in order to determine how much compression to do, as will be described below under the description for FIG. 15. Maximum number-of-lines 418 and threshold-slide 420 are alternative, mutually-exclusive ways for the user to communicate to display-object manager 199 how much compression to do.

Figure 7A:
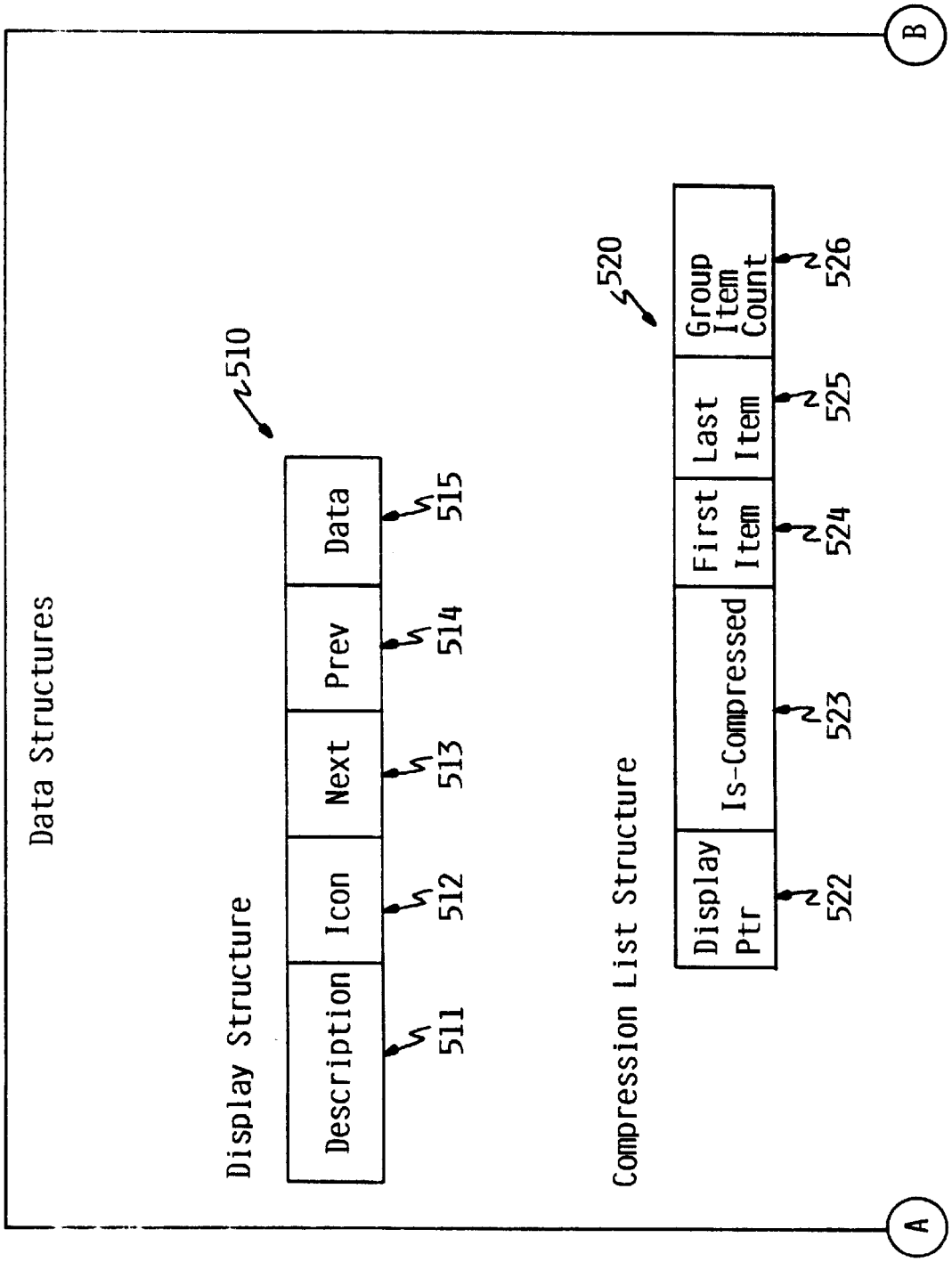
FIGS. 7–10 illustrate block diagram representations of the data structures of the preferred embodiment.
Figure 7B:
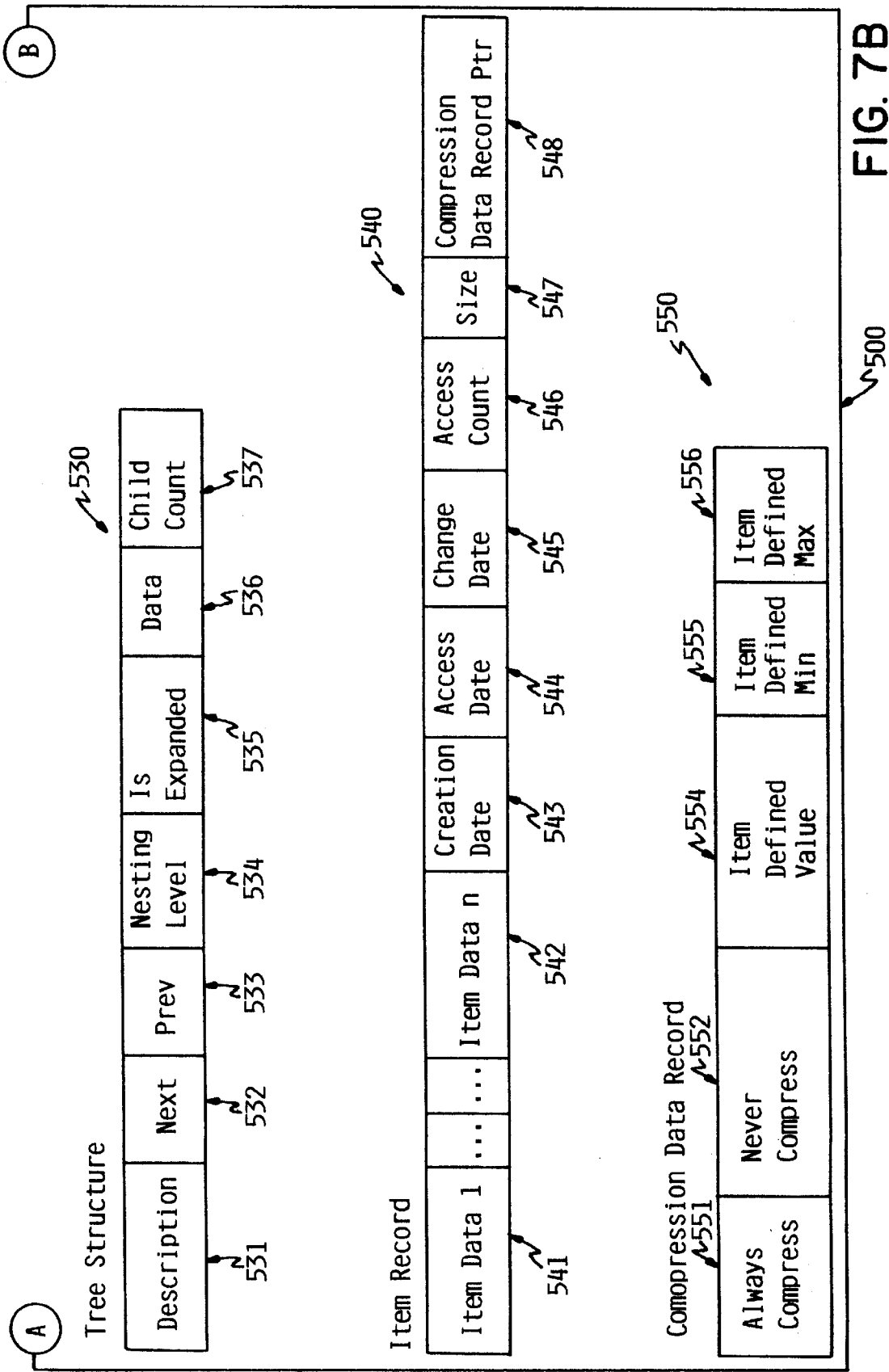

Referring to FIG. 7, a block diagram of data structures 500 of the preferred embodiment is illustrated. Display-structure 510 represents one line of a collected-object display such as shown in FIG. 5, and display-structure 510 can represent one node or multiple nodes of the hierarchical tree being displayed. Display-structure 510 contains description 511, icon 512, next-pointer 513, previous-pointer 514, and data 515. Description 511 contains the text that is displayed on the screen for one node or multiple nodes of a collected object display such as shown in FIG. 5. For example, description 511 could contain the text "6:Dome - 19: Moving In (14 items)", which represents 14 nodes. As another example, description 511 could contain the text "5: Walls", which represents one node. Both of these examples are shown in FIG. 5. Icon 512 contains the representation of the icon or picture that is displayed for the node associated with display-structure 510. An example of the contents of icon 512 is shown in FIG. 5 as icon 501. Next-pointer 513 and previous-pointer 514 point to the next and previous display-structures, respectively, in the list of the display structures that make up the collected object display of FIG. 5. Next-pointer 513 and previous-pointer 514 enable display-object manager 199 to find the next line on the display. Data 515 points to the compression-list structure 520 that is associated with display-structure 510.

Compression-list-structure 520 contains display-pointer 522, is-compressed flag 523, first-item pointer 524, last-item pointer 525, and group-item count 526. Display-pointer 522 points back to the display-structure that is associated with compression-list-structure 520. Is-compressed flag 523 indicates whether there are multiple tree structures associated with this compression-list structure and thus indicates whether the display record associated with this display structure is compressed. First-item pointer 524 and last-item pointer 525 point to the respective first and last tree structures associated with compression-list structure 520. Group-item count 526 refers to the number of item-records associated with this compression-list structure; in the example of FIG. 8 the group item-count for compression-list structure 520b would be "3" since compression-list structure 520b has three item-records associated with it, that is 540b1, 540b2, and 540b3.

A tree-structure 530 is present in the hierarchical tree for all nodes including all those nodes that have been compressed and all those nodes that have been collapsed (unexpanded). Thus, a node is an item of the original, uncompressed, fully-expanded tree. Display-object manager 199 thus processes nodes according to the specified criteria, creates display structures 510, and displays description 511 in display structure 510 as one line on display 114. Only when a node is uncompressed does it appear as a line on display 114 and then only via description 511 in display structure 510.

Tree-structure 530 contains description 531, next-pointer 532, previous-pointer 533, nesting-level 534, is-expanded-flag 535, data 536, and child-count 537. Description 531 contains the original description for the node. If this node has not been compressed, then description 531 and description 511 are identical, and description 511 is displayed on the display. If this node has been compressed, description 531 contains the original description for this node. (If this node has been compressed, then description 511 contains the text that describes the multiple, compressed entries.) Next-pointer 532 and previous-pointer 533 point to the next and previous tree structures respectively in the list associated with this compression-list structure. Nesting-level 534 refers to how many levels the node represented by this tree-structure is from the root of the original tree displayed on the display screen. is-expanded-flag 535 refers to whether or not this node is expanded. "Expanding" refers to an entire branch while "compressing" refers to a subset of nodes within a branch. Data 536 points to the item-record associated with this tree structure. There will be 19 tree-structure data-structures in the list associated with the compression-list structure for "Building a Geodesic Dome" in the example of FIG. 6. Likewise, there will be 112 tree-structures in the list associated with the compression-list structure for "Industry-Zoology", in the example of FIG. 6. Child-count 537 contains a count of the number of child nodes at the next level of the tree for this tree structure 530, as further described under the description for FIG. 9, below.

Referring again to FIG. 7, item-record 540 contains the underlying data associated with the node; for example the item-record 540 associated with the last displayed node on FIG. 4 might contain records of an article on how to hang and tape sheetrock. Item-record 540 contains item-data 541 through item-data 542, creation-date 543, access-date 544, change-date 545, access-count 546, size 547, and compression-data-record pointer 548. Item-data 541 through item-data 542 contain the actual underlying data that the user would be interested in. In the example of FIG. 5, this could be the actual text of the book that relates to the node. Creation-date 543 is the date that the item-record was created. Access-date 544 is the date that this item-record was last accessed. Change-date 545 is the date that this item-record was last changed. Access-count 546 is the number of times that this item-record had been accessed since the creation date. Size 547 is the number of bytes of data in this item-record. Compression-data-record pointer 548 points to compression-data-record 550 associated with this item-record.

Compression-data-record 550 contains values for user-selectable parameters that the preferred embodiment will use to compress the collected nodes. Compression-data-record 550 contains always-compressed flag 551, never-compressed flag 552, item-defined-value 554, item-defined-new-minimum 555, and item-defined-maximum 556. Always-compressed flag 551 and never-compressed flag 552 are set from the corresponding user-selected options shown in compression-control 421 in FIG. 6 in the pop-up window. Item-defined-value 554 is a value in compression-data-record 550 that the preferred embodiment can use to compare against item-defined-minimum 555 and item-defined-maximum 556 in order to make a decision about whether or not to compress the data associated with this compression data record.

Figure 8:
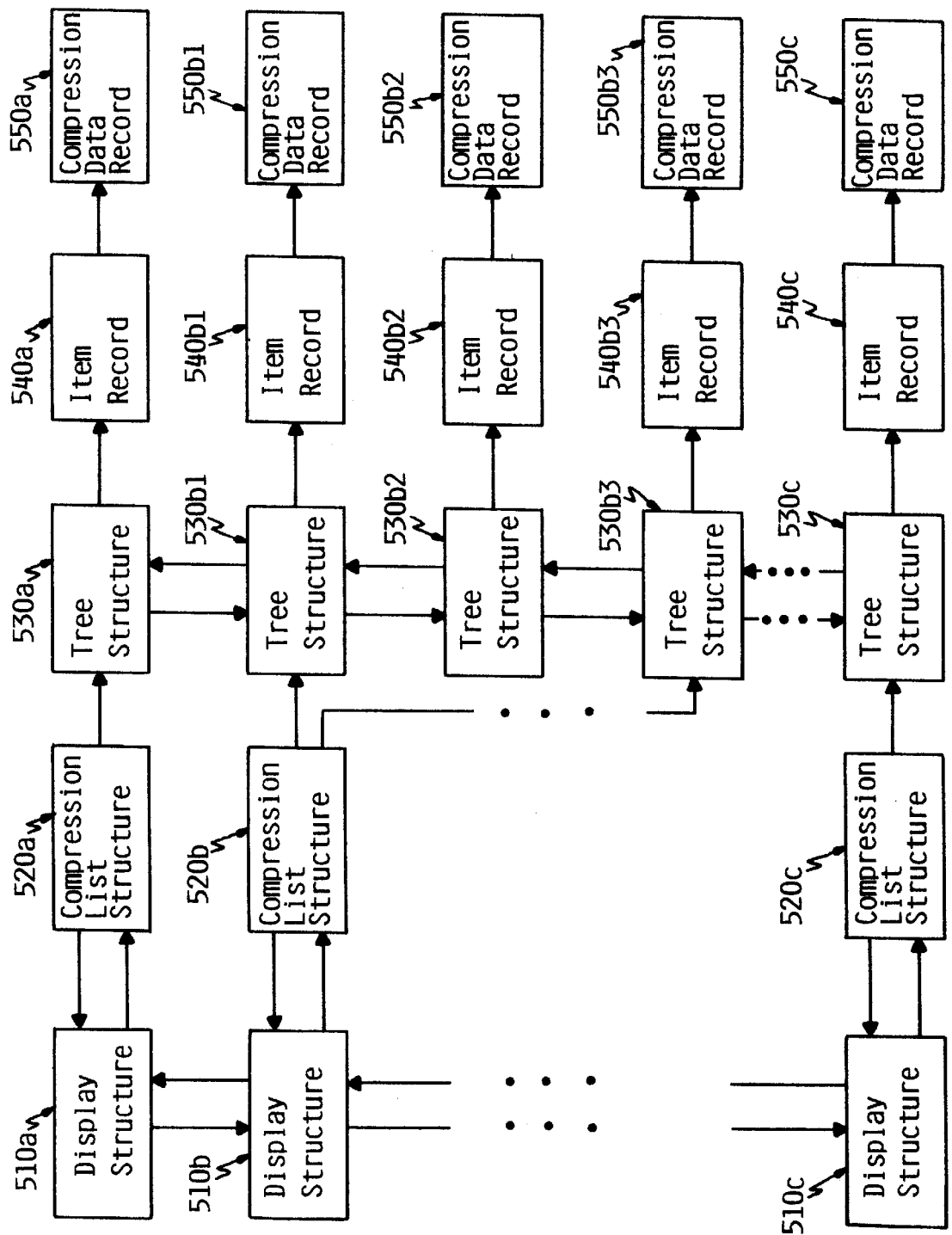

Referring to FIG. 8, a sample organization of the data structures from FIG. 7 is shown. In this example, the collected display will have three displayed nodes represented by display-structures 510a, 510b, and 510c. Each display-structure has a respective compression-list-structure represented by 520a, 520b, and 520c. Two of the nodes are un-compressed; thus, the node represented by display-structure 510a only has one tree-structure 530a, and the node represented by display-structure 530c only has one tree-structure 530c. In contrast, the node represented by display-structure 510b is compressed, so it has three tree-structures 530b1, 530b2, and 530b3. Tree-structure 530b1 has associated item-record 540b1 and associated compression-data-record 550b1. Tree-structure 530b2 has associated item-record 540b2, and associated compression-data-record 550b2. Tree structure 550b3 has associated item-record 540b3, and compression-data-record 550b3.

Figure 9A:
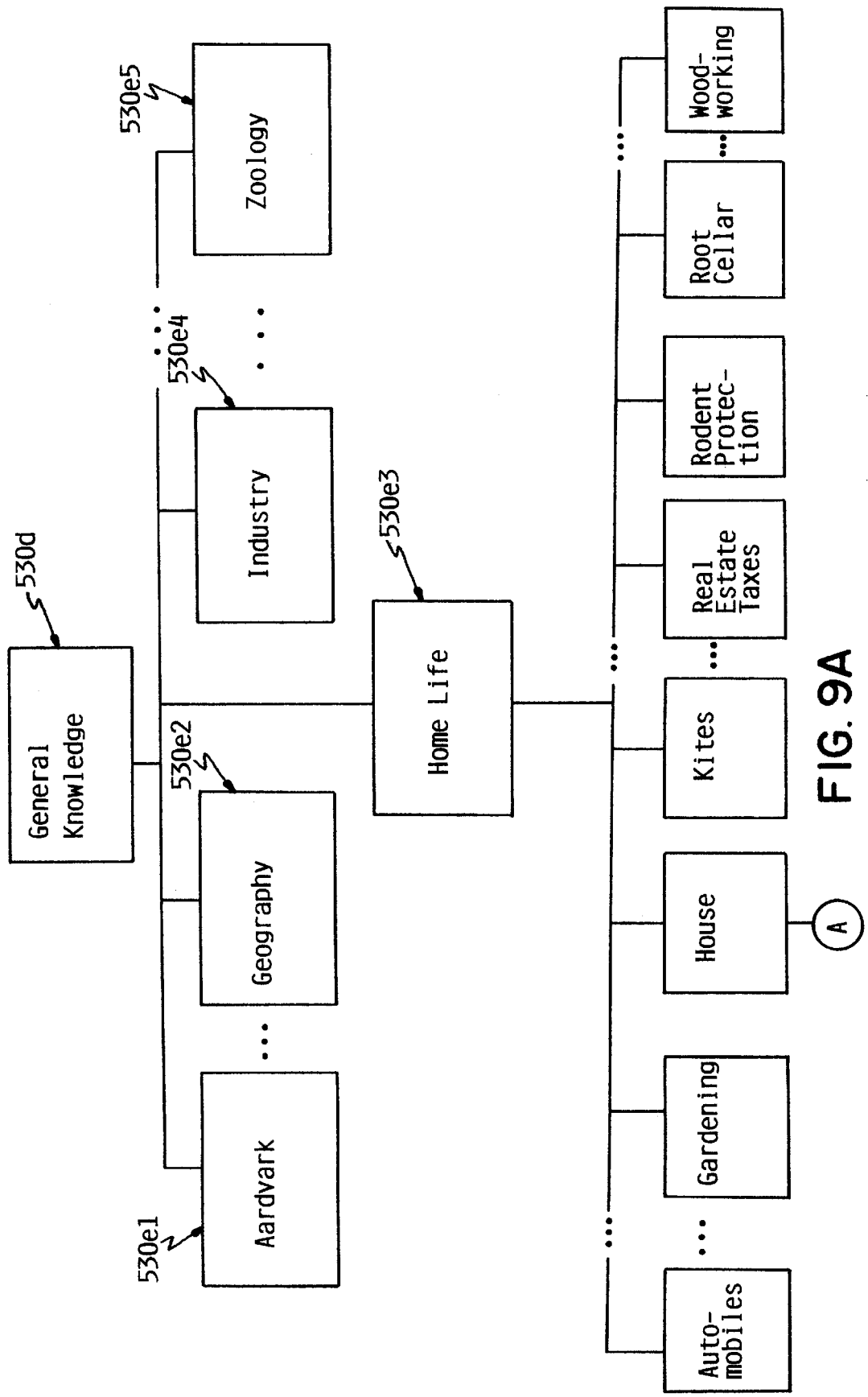
Figure 9B:
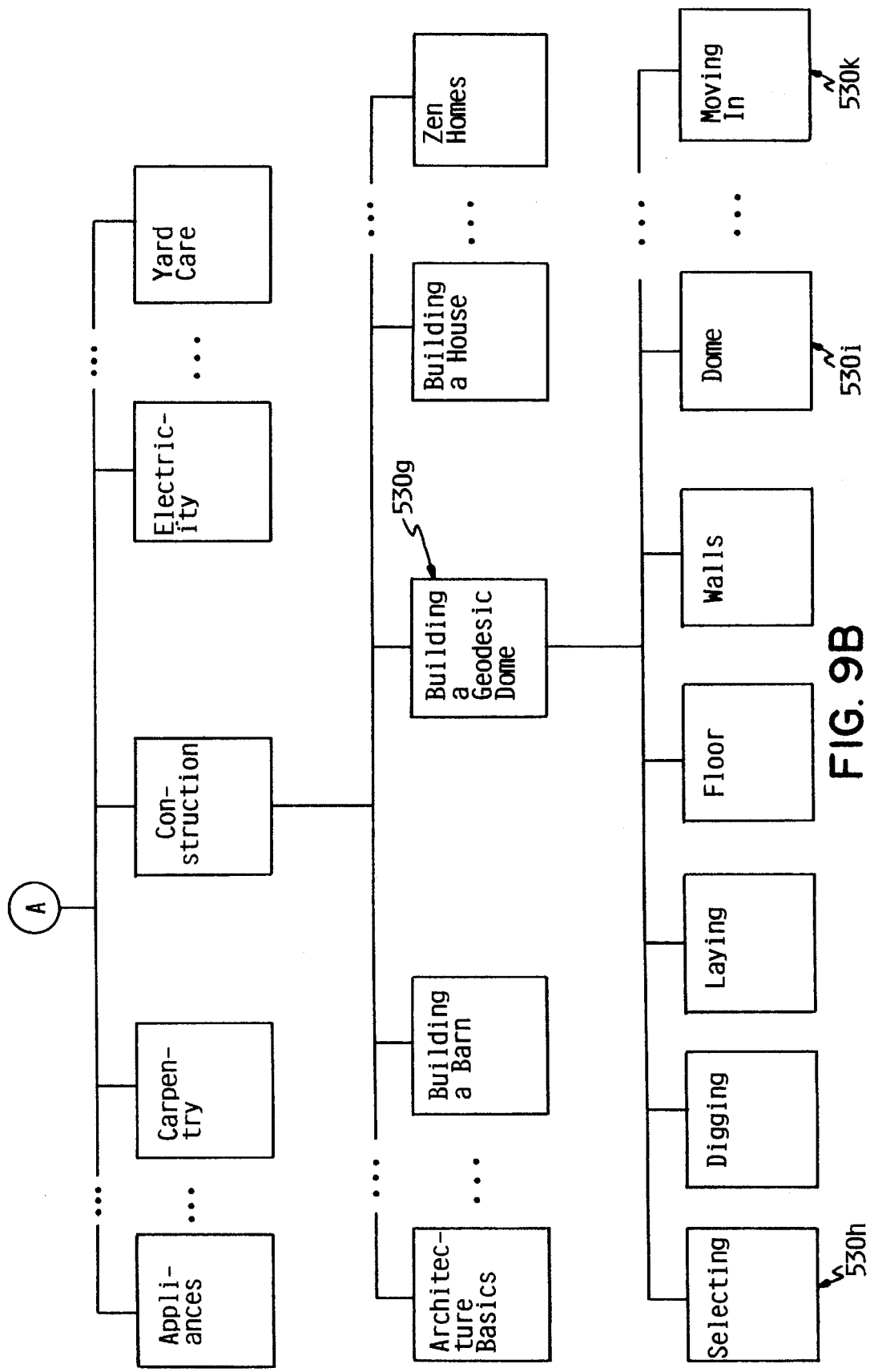

Referring to FIG. 9, the organization of the tree structures 530 for the example of FIG. 5 is shown. The text in each of the boxes represents the contents of description 531. The lines between each of the nodes represent the parent-child relationships. Tree structure 530d is the root node of the tree and has children tree structures 530e1–530e2, 530e3, and 530e4–530e5. Tree structures 530e1–530e5 are all siblings with a common parent. Of particular interest are tree structures 530g, 530h, 530i, and 530k, which are described in more detail under the description for FIG. 10, below.

Figure 10A:
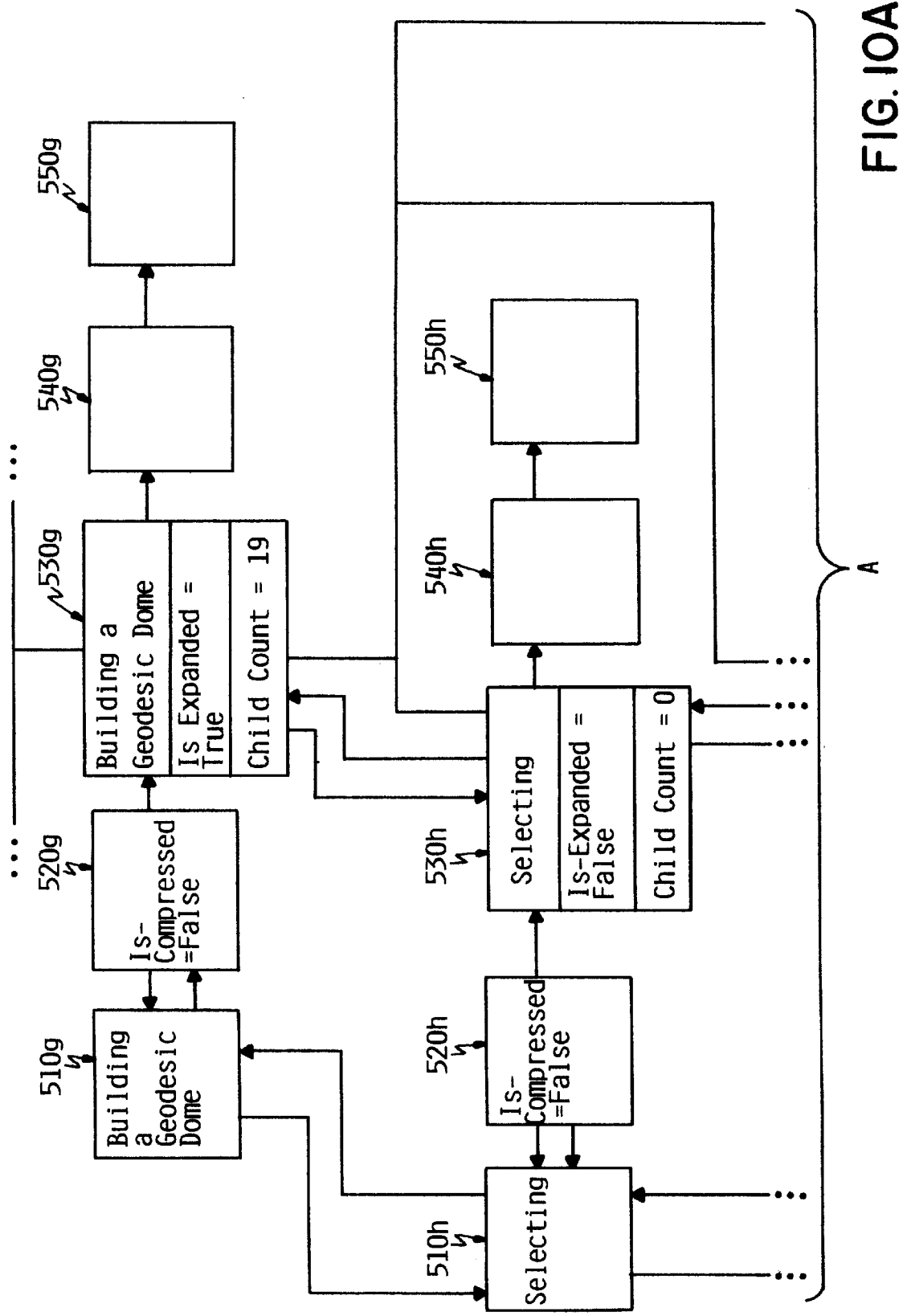
Figure 10B:
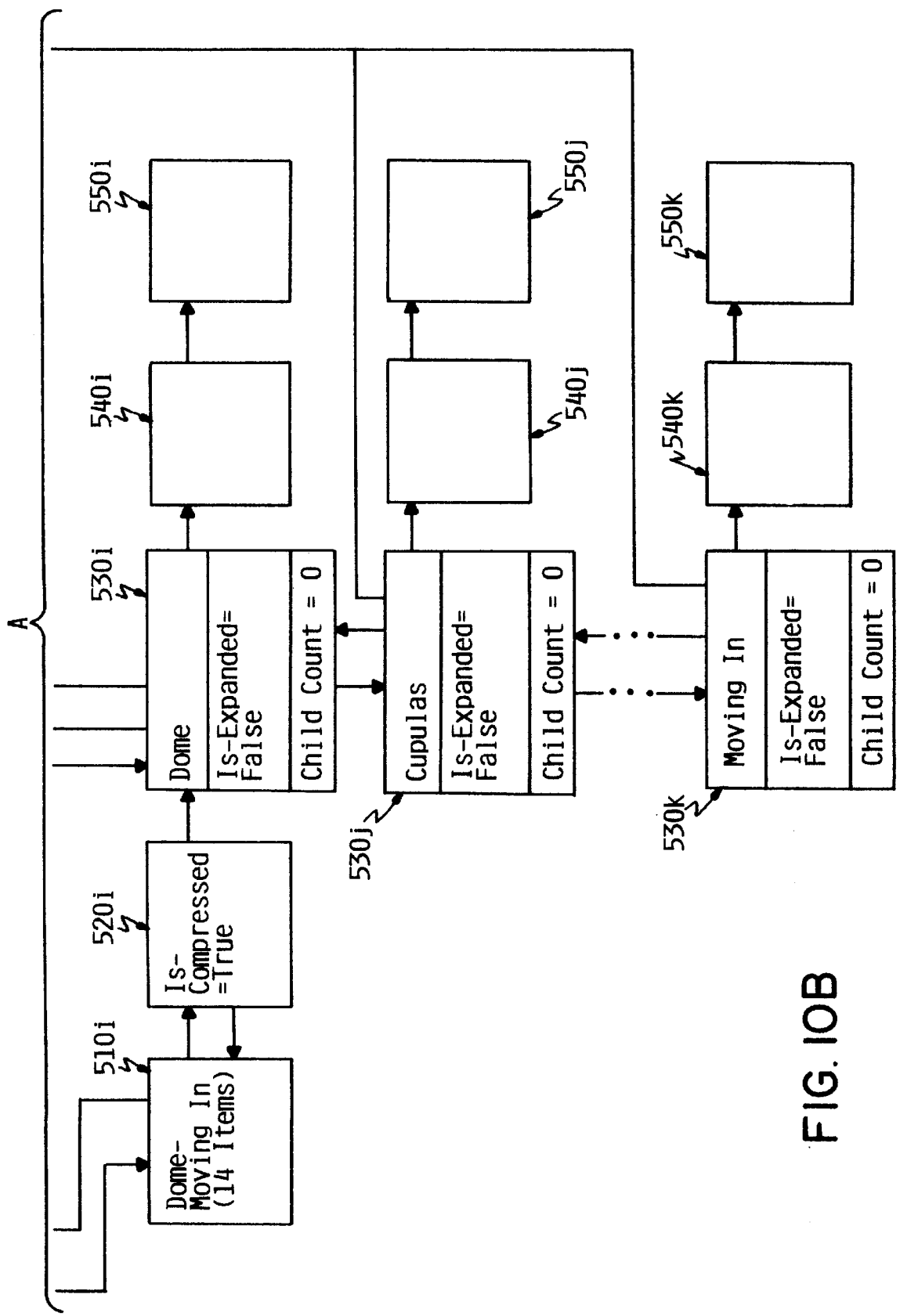

Referring to FIG. 10, the organization of all the data structures for a portion of the display in the example of FIG. 5 is shown. The lines with arrows represent the pointers as illustrated in FIG. 8 while the lines without arrows represent the parent-child relationships illustrated in FIG. 9.

Referring again to FIG. 10, illustrated are display structures 510g, 510h, and 510i. Illustrated are compression list structures 520g, 520h, and 520i, associated with the respective display structures. Illustrated are tree structures 530g, 530h, 530i, 530j, and 530k. Tree structure 530g is the parent of tree structures 530h, 530i, 530j, and 530k. Tree structures 530h, 530i, 530j, and 530k are siblings. Illustrated are item records 540g, 540h, 540i, 540j, and 540k. Illustrated are compression data records 550g, 550h, 550i, 550j, and 550k.

Display structure 510g includes a description field that contains the description "Building a Geodesic Dome". Display structure 510h includes a description field that contains the description "Selecting". Display structure 510i includes a description field that contains the description "Dome-Moving-In (14 items)".

Compression list structure 520g includes an is-compressed field set to false. Compression list structure 520h includes an is-compressed field set to false. Compression list structure 520i contains an is-compressed field set to true.

Tree structure 530g includes a description field with contents "Building a Geodesic Dome", an is-expanded field set to true, and a child count field set to 19, which indicates that tree structure 530g has 19 children. These children are tree structures 530h, . . . , 530i, 530j, . . . , 530k. Tree structure 530h includes a description field with contents "selecting", an is-expanded field set to false, and a child count field set to zero. Tree structure 530i includes a description field with contents "Dome", an is-expanded field set to false, and a child count field set to zero. Tree structure 530j includes a description field with contents "Cupulas", an is-expanded field set to false, and a child count field set to zero. Tree structure 530k includes a description field with contents "Moving In", an is-expanded field set to false, and a child count field set to zero.

Display structure 510g points to display structure 510h and so on through a linked list of display structures until display structure 510i is reached. Display structure 510i points backward through the linked list of display structures until display structure 510h is reached, which points to display structure 510g. Display structure 510g points to compression list structure 520g, which points back at display structure 510g. Display structure 510h points to compression list structure 520h, which points back at display structure 510h. Display structure 510i points to compression list structure 520i, which points back to display structure 510i. Tree structure 530g points to tree structure 530h, which points back at tree structure 530g, and this forward and backward pointing between tree structures continues through the tree structures. Tree structure 530g points to item record 540g, which points to compression data record 550g. Tree structure 530h points to item record 540h, which points to compression data record 550h. Tree structure 530i points to item record 540i which points to compression data record 550i. Tree structure 530j points to item record 540j, which points to compression data record 550j. Tree structure 530k points to item record 540k, which points to compression data record 550k.

Figure 11A:
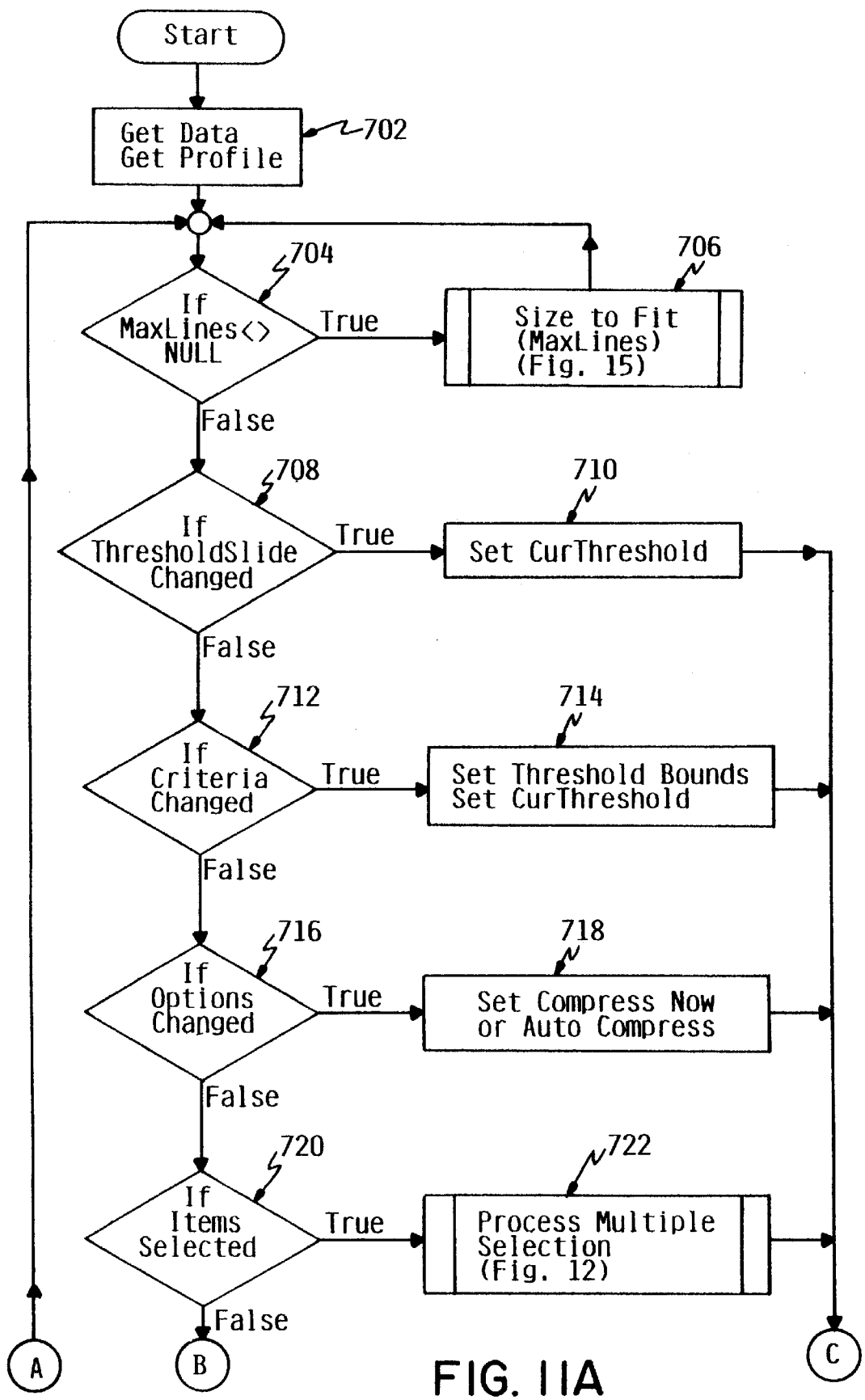
FIGS. 11–16 illustrate flowcharts that describe the operation of the preferred embodiment.
Figure 11B:
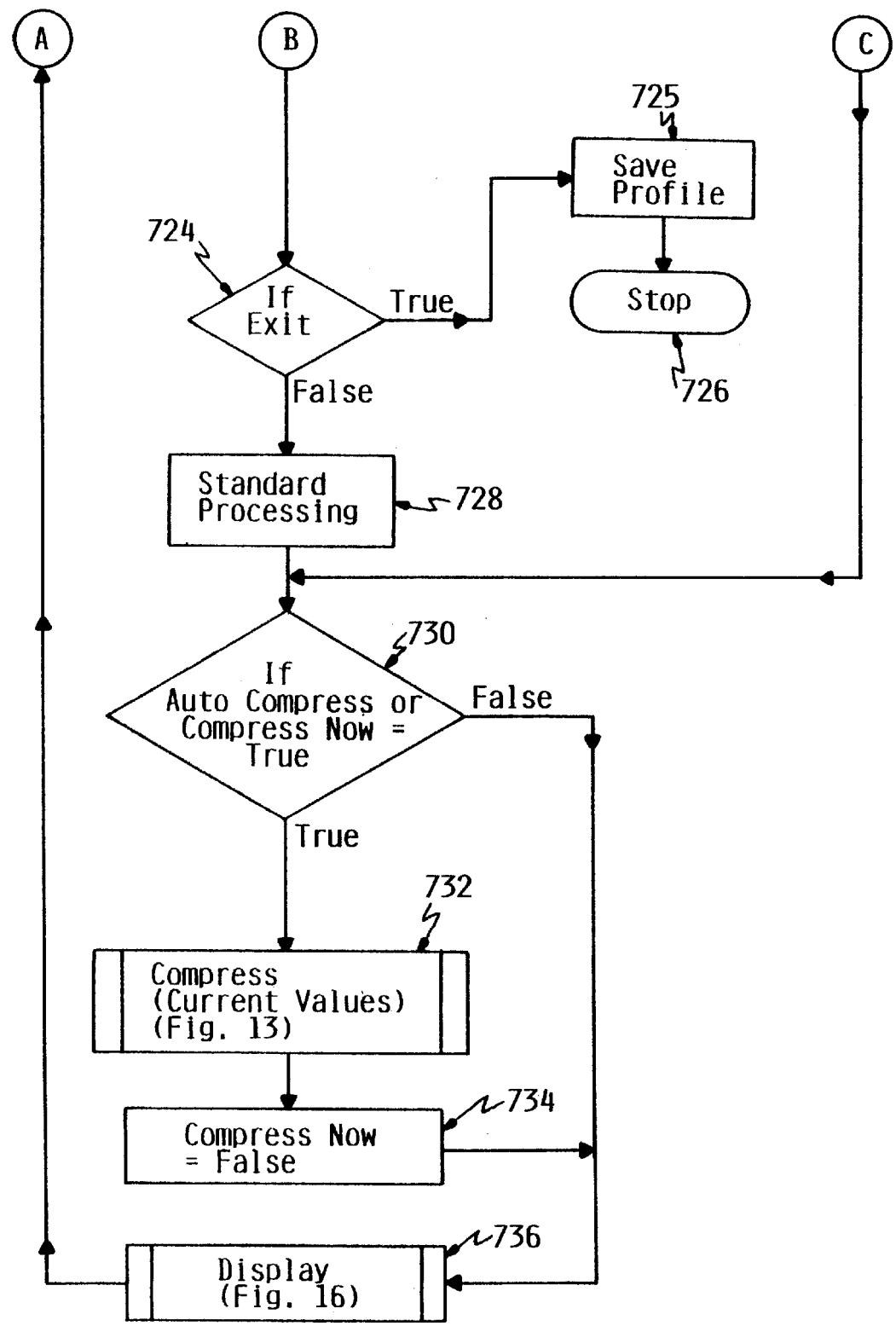

Referring to FIG. 11, the logic for display-object manager 199 is shown that is invoked whenever a user requests an operation against the hierarchical object display shown in exemplary form as FIGS. 4, 5, and 6. At block 702, display-object manager 199 retrieves all of the data associated with the collected-object tree that the user is currently viewing. The data includes all of tree structures 530 and item records 540 associated with this hierarchical tree display. Also at block 702, display-object manager 199 retrieves user-profile 191, which loads all of the parameters that the user previously selected using the front-of-screen interface shown in FIG. 6. Also at block 702, display-object manager 199 builds display structures 510, compression list structures 520, and compression data records 550, for initial use, with one display structure 510 for each tree structure 530 because the tree is not yet compressed. At block 704, display-object manager 199 checks whether maximum number-of-lines 418 that the user wants to see displayed at one time is null. The maximum number-of-lines would be null if the user had some other criteria for compressing nodes, such as "creation date", "change date", or "access date" as shown in FIG. 6. If maximum number-of-lines 418 is not null, then display-object manager 199 compresses the nodes of the tree to fit within the user-selected number-of-lines at block 706, as described below under the description for FIG. 15.

If the maximum number-of-lines is equal to null, then display-object manager 199, at block 708, checks whether threshold-slide 420 has been changed. If threshold-slide 420 has been changed, then at block 710, display-object manager 199 scales the slider position to a number, which is the current threshold, and continues to block 730 as further described below. In the preferred embodiment, the slider-position scaled-number is between 0 and 100.

If threshold-slide 420 has not been changed, then at block 712, display-object manager 199 checks whether the user has changed criteria 422. If criteria 422 has been changed, then at block 714, display-object manager 199 determines the threshold to bounds, which is the minimum and maximum values for the user-selected criteria 422, and sets the current threshold selected by the user via threshold-slide 420. Also at block 714 if criteria 422 is "item defined", display-object manager 199 invokes item-defined program 193, which is a user-created program that copies user-selected information into item-defined value 554, item-defined minimum 555, and item-defined maximum 556 in compression data record 550. Control then continues to block 730 as described below.

If the criteria has not been changed, then at block 716, display-object manager 199 checks whether any of options 424 have been changed by the user. If the user has changed options 424, then display-object manager 199 loads the selected setting at block 718. For example, if "compress now" was selected by the user via options 424, then compress-now is set to be true, and if "auto-compress" was set via options 424 by the user, then auto-compress is set to be true. Control then continues to block 730, as described below.

If options 424 have not been changed, then at block 720, display-object manager 199 checks whether the user has selected nodes on the display for compression. The user can select nodes for compression by, for example, a pointer drag operation, such as by moving the pointer on the screen to a node using mouse 118, depressing the mouse button, and then moving the pointer across the desired nodes. If the user has selected some nodes on the display, then at block 722, display-object manager 199 processes the multiple selected nodes as further described under the description for FIG. 12. Control then continues to block 730, as described below.

If the user has not selected items for compression at block 720, then control continues to block 724 where display-object manager 199 checks whether the user has decided to exit from the display of collected objects. If the user has selected to exit, then display-object manager 199 continues to block 725 where it saves user-profile 191 and continues to block 726 where it stops. If the user has not selected to exit, then at block 728, display-object manager 199 performs the standard processing for the display of collected objects, such as for example, displaying the underlying text for a user-selected object. Control then continues to block 730.

At block 730, display-object manager 199 checks whether the user has selected auto-compress or compress now from options 424. If the user has not selected auto-compress or compress now, then control continues to block 736 where file-manger 199 displays the formatted contents of the data structures illustrated in FIG. 7. Flow then returns to block 704. If the user has selected auto-compress or compress now, then display-object manager 199 compresses the nodes, as further described in FIG. 13. Control then continues to block 734 where display-object manager 199 sets compress-now to be false. Flow then continues to block 736 where display-object manager 199 displays the formatted contents of all description 511 for all display structures 510, as further described under the description for FIG. 16. Flow then returns to block 704.

Figure 12:
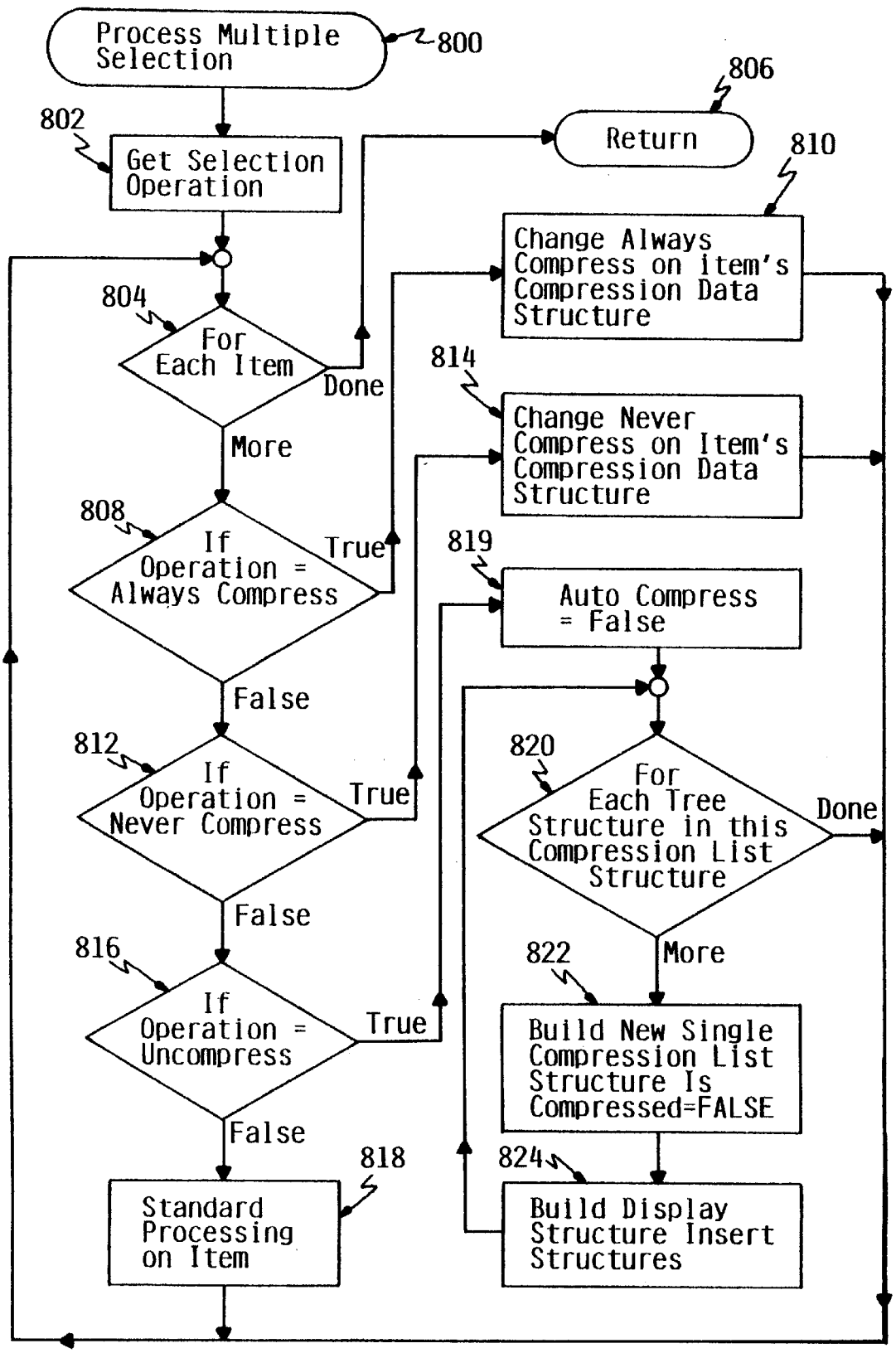

Referring to FIG. 12, a flowchart for processing multiple nodes selected by the user is shown. At block 800 flow starts. At block 802, display-object manager 199 retrieves the option selected by the user, which as shown in FIG. 6 may be "always compress", "never compress", or "uncompress". At block 804, display-object manager 199 initiates a loop that executes for every display-line item selected by the user. When all display-line items have been processed, display-object manager 199 returns at block 806.

As long as there are more display-line items to process, display-object manager 199 continues to block 808, where it checks if the operation selected by the user is "always compress". If the operation selected by the user was "always compress", then at block 810 display-object manager 199 sets always-compress-flag 551 in the current item's compression-data-record to be "always compress". Control then continues to block 804.

If the operation was not "always compress", then display-object manager 199 at block 812 checks whether the operation selected by the user was "never compress". If the operation selected by the user was "never compress", then display-object manager 199 at block 814 sets never-compress-flag 552 to be "never compress" in the compression-data-record for the current item. Control then continues to block 804.

If the operation selected by the user was not "never compress", then display-object manager 199 at block 816 checks whether the operation selected by the user was "uncompress". If the operation selected by the user is not "uncompress", then the user has selected some other operation against this item, so display-object manager 199 continues to block 818 and performs whatever standard processing is necessary for the operation selected by the user. For example, the user might have selected an operation to display the underlying text associated with this item. Control then continues to block 804.

If the user selected "uncompress", then display-object manager 199 continues to block 819 where it sets auto compress to be false, and then proceeds to block 820 where it initiates a loop processing every tree structure in the compression list associated with the item currently being processed. When there are no more tree structures in this compression list, control continues to block 804. As long as there are tree structures left to be processed in this compression list, control continues to block 822, where display-object manager 199 builds a new compression-list structure 520 for the current tree-structure that is being un-compressed and inserts it into the list of compression list structures (520a, 520b, . . . , 520c). Also at block 822, display-object manager 199 sets is-compressed-flag 523 in the compression-list structure to be false. At block 824, display-object manager 199 builds and initializes display structure 510 associated with the current tree structure and inserts it into the list of display structures (510a, 510b, . . . , 510c). Description 511 in display structure 510 is set from description 531 in tree structure 530 as part of this build and initialization process. Control then continues back to block 820, where processing for the next tree structure is begun.

Figure 13A:
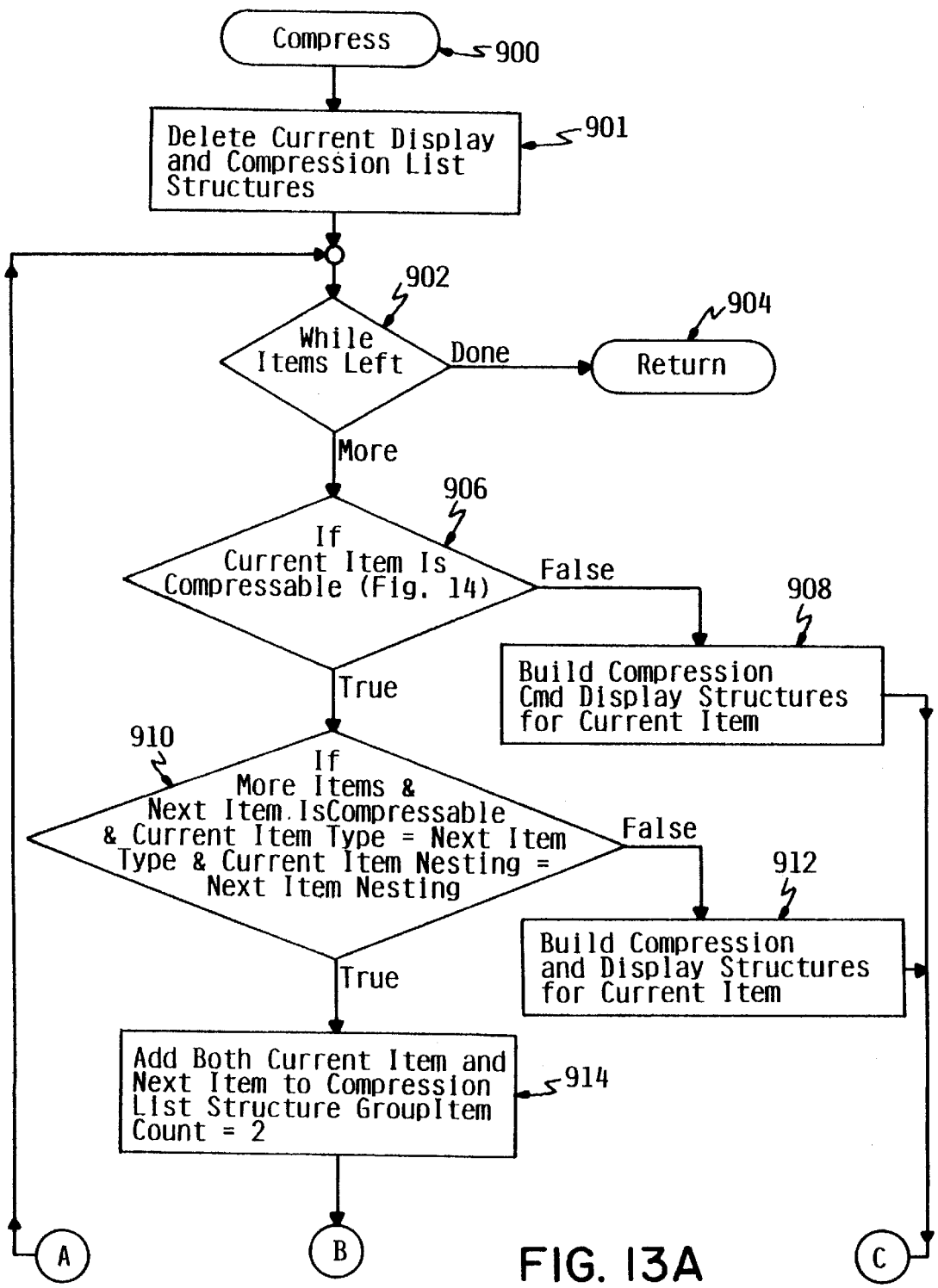
Figure 13B:
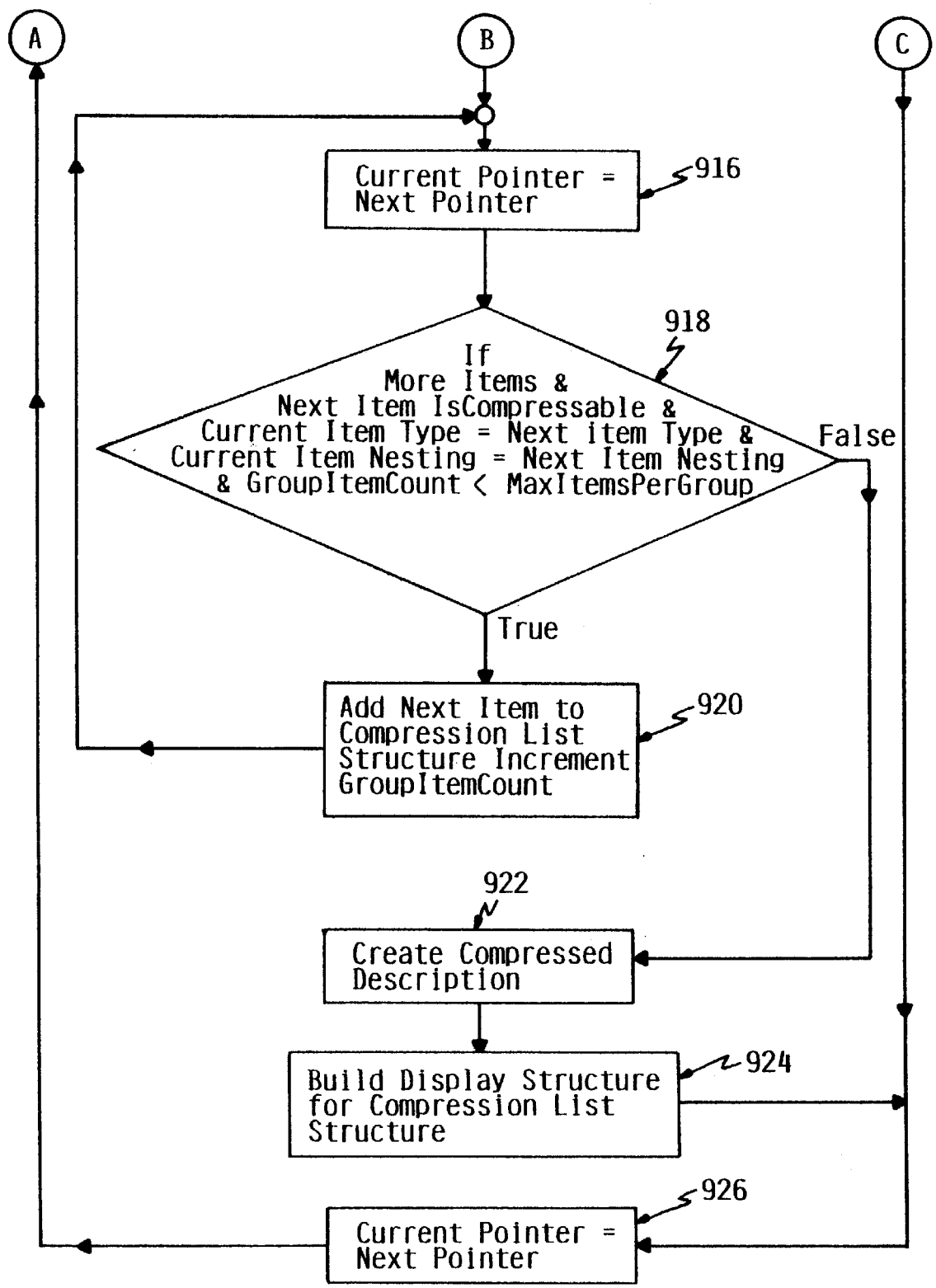

Referring to FIG. 13, a flow chart for automatically compressing items is shown. Display-object manager 199 starts with tree-structure 530 and item-record 540 and will create a new display-structure 510 and compression-list structure 520. Flow starts at block 900. At block 901, display-object manager 199 deletes the current display-structure and the current compression-list structure. At block 902, display-object manager 199 checks whether there are items in the current tree view left to be processed. If all items have been processed, then processing completes at block 904. If there are still items left to be processed then control continues to block 906, where display-object manager 199 checks whether the current item is compressible, as further described under the description for FIG. 14.

Referring again to FIG. 13, if the current item is not compressible, then at block 908, display-object manager 199 builds display-structure 510 and compression-list structure 520 for the current item, and at block 926 uses next-pointer 513 to find the next display structure before continuing to block 902. Part of the building step in block 908 is the step of copying description 531 in tree structure 532 to description 511 in display structure 510.

If the current item is compressible, control continues to block 910, where display-object manager 199 checks if there are still more items left and if the next item is compressible and if the current item-type equals the next item-type and if the current-item nesting-level equals the next-item nesting-level. Display-object manager 199 determines if there are more items by checking whether next-pointer 513 in display-structure 510 is null. Display-object manager 199 determines if the next item is compressible by executing the logic as is further described under the description for FIG. 14.

Referring again to FIG. 13, display-object manager 199 determines whether the current item-type equals the next-item type by checking the file extension of the object or by interrogating the object. Lists of objects can be of heterogeneous and have different types, such as executable programs, batch files, sign files, word-processing documents, and movies. Each object, or item, has a type that determines both the icon to be displayed and the operations that may be performed on the object. Display-object manager 199 can determine the item-type by examining the extension of the object in the file structure. Display-object manager 199 can also determine the item-type by interrogating an embedded hidden code that does not appear in the file structure, but is apparent to and can be examined by application programs or operating system procedures, such as display-object manager 199.

Display-object manager 199 determines whether the current-item nesting-level equals the next-item nesting-level by checking nesting-level 534 in tree-structure 530.

If the check at block 910 is false, then at block 912, display-object manager 199 builds display-structure 510 and compression-list structure 520 for the current-item. Control then continues to block 926 where the next display-structure is selected before returning to block 902.

If the check at block 910 is true, then at block 914, display-object manager 199 adds the tree structure 530 for both the current item and the next item to compression-list structure 520. Also at block 914, group-item count 526 is set to two, which is the number of items in column 540 of FIG. 8 that are associated with this display-structure. Control then continues to block 916, where display-object manager 199 uses next-pointer 522 to find the next display structure. At block 918, display-object manager 199 checks for more items to process, and whether the next item is compressible, and whether the current item-type equals the next item-type and whether the item-nesting-level equals the next-item-nesting-level and whether the group item-count is less than the maximum items-per-group. Display-object manager 199 checks to see if there are more items by checking if the current pointer is not null. Display-object manager 199 checks whether the next item is compressible by invoking the logic described under the description for FIG. 14. Display-object manager 199 checks whether the current item-type equals the next item-type by checking the file type or interrogating the object. Display-object manager 199 checks whether the current-item nesting-level equals the next-item nesting-level by checking whether nesting-level 534 in the current tree-structure equals the value in the nesting-level field for the next tree-structure. The maximum number of items-per-group is a predetermined constant, although in an alternative embodiment it could be user changeable.

If the check at block 918 is false, then display-object manager 199 at block 922 creates a compressed description by using description-field 531 from the first tree structure in the compression-list and the description-field 531 from the last tree structure from the compression list. In the preferred embodiment, the compressed description is a concatenation of the first identifier in the compressed subset (description-field 531 from the first tree structure), the last identifier in the compressed subset (description-field 531 from the last tree structure), and the number of objects in the compressed subset (the number of tree structures 530 associated with this compression list 520). But, the compressed description could be anything that identifies this compressed subset of the tree. This compressed description is stored in description-field 511 of display-structure 510. Control then continues to block 924, where display-object manager 199 builds display-structure 510 for the current compression-list-structure 520. Control then continues to block 926 where the next display structure is selected before returning to block 902.

Figure 14:
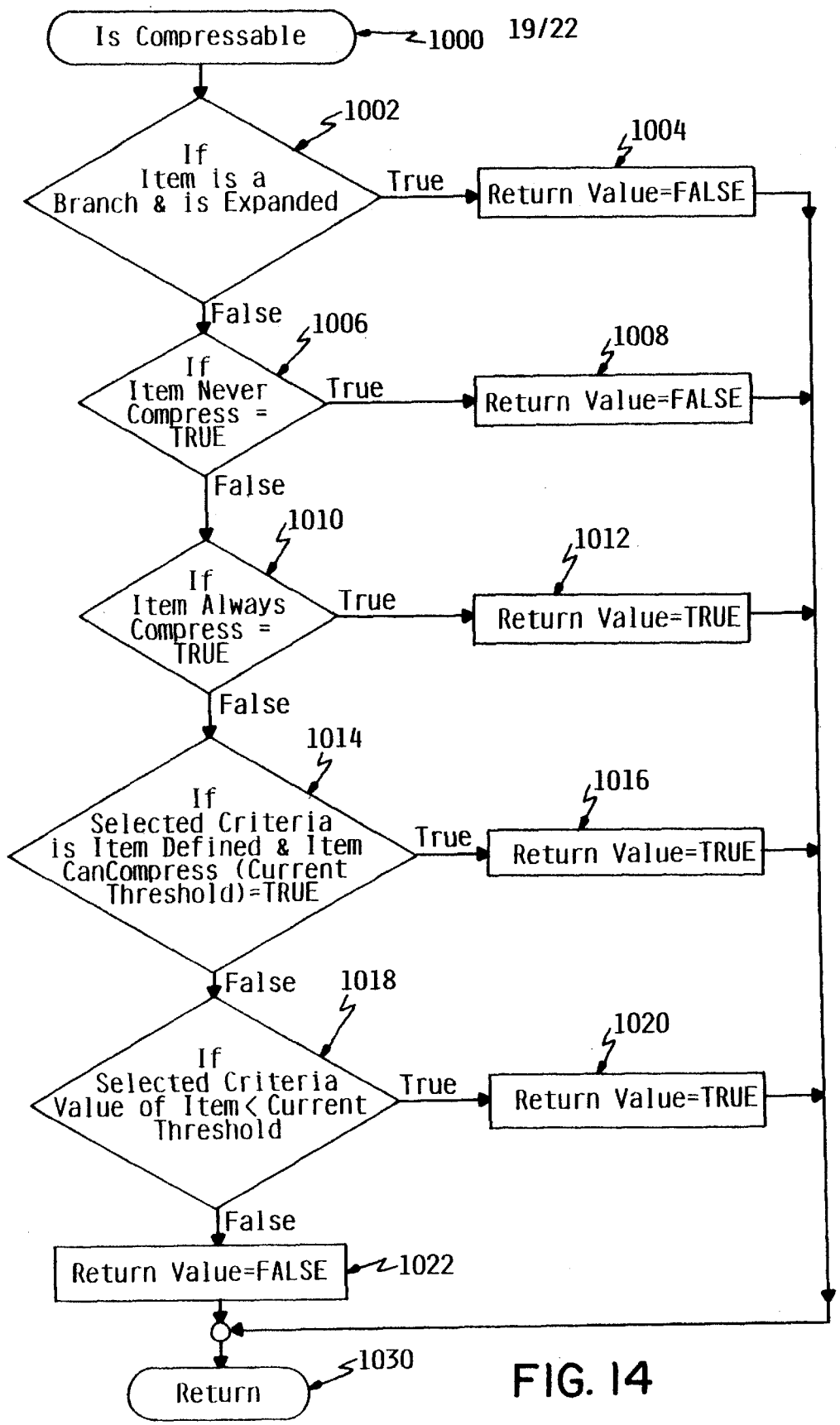

Referring to FIG. 14, the logic for determining whether or not a tree structure is compressible is shown. The logic represented by FIG. 14 is a function that returns a value of true or false. Control starts at block 1000. If display-object manager 199 determines at block 1002 that the item associated with the current tree structure is a branch and is expanded, then display-object manager 199 sets the return value to be false at 1004 and returns at block 1030. Display-object manager 199 determines that an item is a branch by checking child-count 537. If child-count 537 is zero, then the current tree-structure is a child node in the tree. If child-count 537 is greater than zero, then the current tree-structure is a branch in the tree. Display-object manager 199 determines that an item is expanded by checking is-expanded 535.

If the check at block 1002 is false, then display-object manager 199 continues to block 1006 where it checks whether never-compressed flag 552 in compression-data record 550 associated with the current tree-structure is true. If the check at block 1006 is true, then display-object manager 199 sets the return value to be false at block 1008 and returns at block 1030.

If the check at block 1006 is false, then display-object manager 199 continues to block 1010 where it checks if always-compressed-field 551 in compression-data record 550 associated with this tree-structure 530 is true. If the check at block 1010 is true then display-object manager 199 at block 1012 sets return value to be true and returns at block 1030.

If the check at block 1010 is false, then display-object manager 199 continues to block 1014, where it checks whether the selected criteria is item-defined and the item-can-compress threshold equals true. The selected criteria is item-defined when the user has selected "Item Define" from criteria 422 (FIG. 6). Item-can-compress refers to the following check: if item-value 554 divided by (item-defined-maximum 556 minus item-defined-minimum 555) is less than (the threshold specified by the user on slider 420 divided by 100), then item-can-compress is true. If the check at block 1014 is true, then display-object manager 199 continues to block 1016 where it sets the function return-value to be true, and returns at block 1030.

If the check at block 1014 is false, then display-object manager 199 continues to block 1018, where it checks whether the selected criteria-value of the current-item is less than the current threshold. The selected criteria-value was set from criteria 422, as shown on FIG. 6. If the check at block 1018 is true, then display-object manager 199 continues to block 1020, where it sets the return value to be true and returns at block 1030.

If the check at block 1018 is false, then display-object manager 199 continues to block 1022 where it sets the return value to be false and returns at block 1030.

Figure 15A:
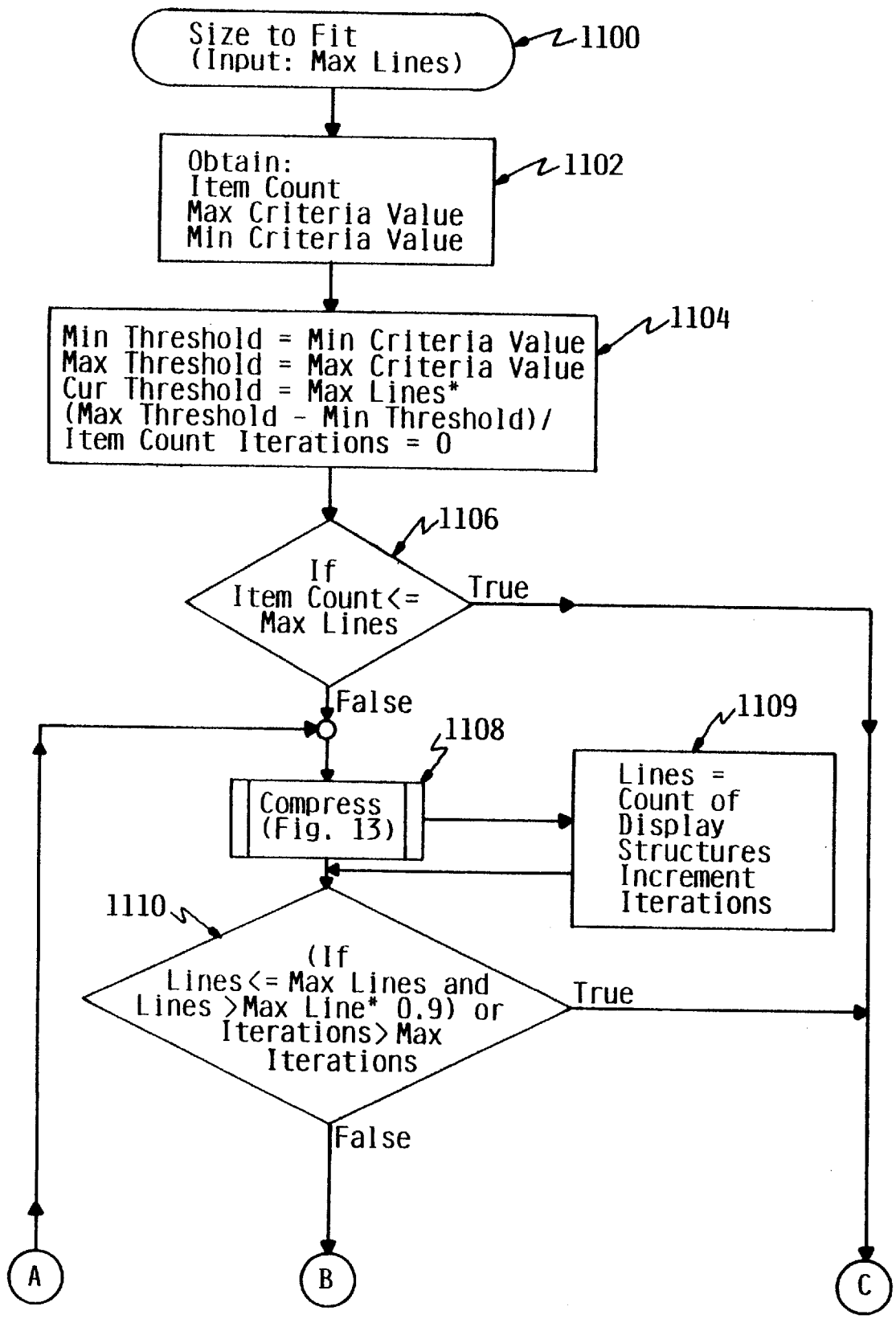
Figure 15B:
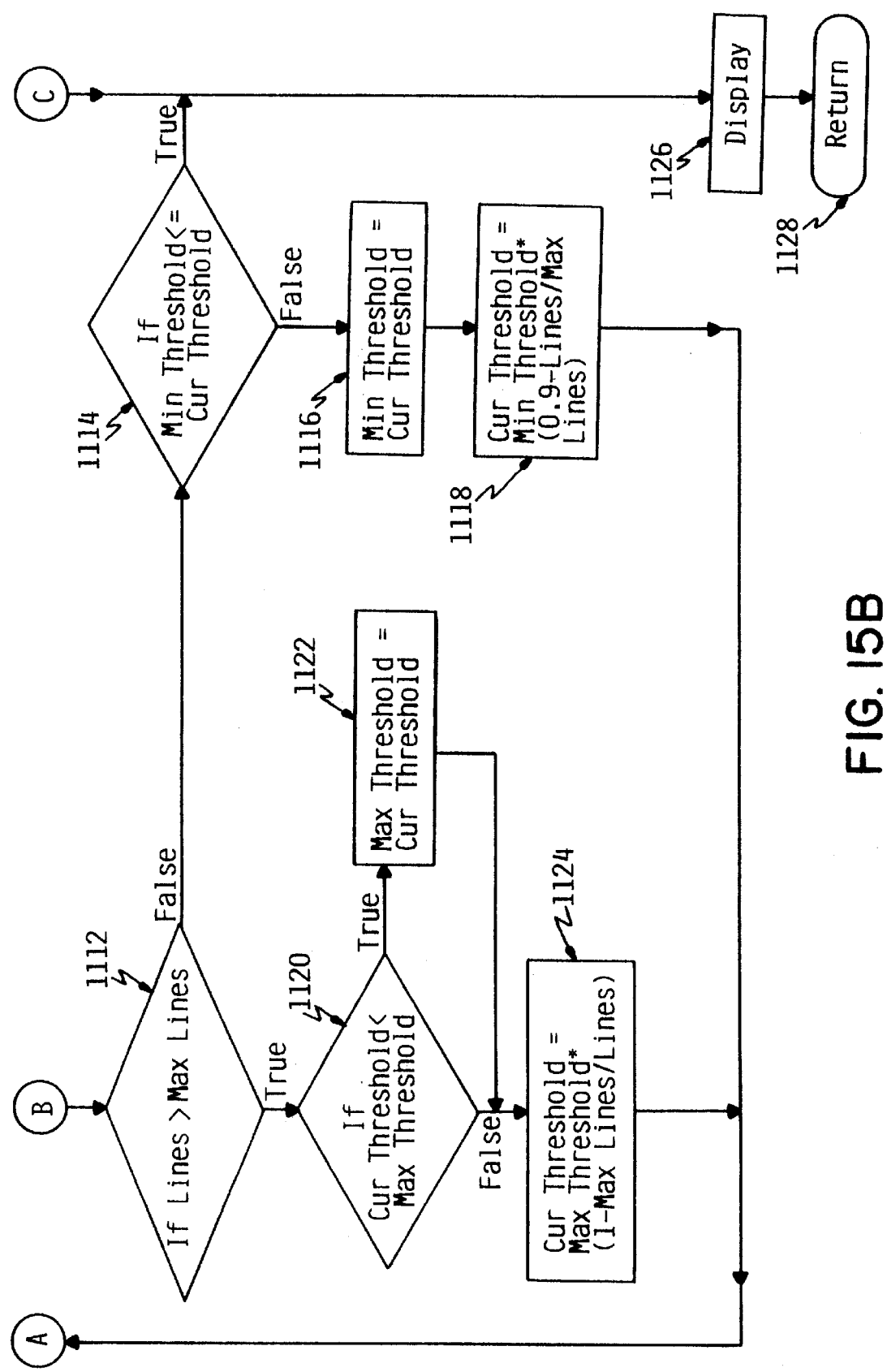

Referring to FIG. 15, logic is shown that compresses the number of items on a screen to fit the maximum number-of-lines desired by the user. Control starts at block 1100. At block 1102, display-object manager 199 retrieves the item-count, the maximum-criteria value, and the minimum-criteria value. The item-count is, for example, the number of item-records; for example, the number of rows in column 540 of FIG. 8, associated with the current display structure. Maximum and minimum criteria values are set by the user via criteria-control 422 (FIG. 6). Referring again to FIG. 15, control continues to block 1104 where display-object manager 199 sets the minimum-threshold to be the minimum-criteria value, sets the maximum-threshold to be the maximum-criteria value, sets the current-threshold to be the maximum-line-number times (Maximum-threshold minus the minimum-threshold) divided by the item-count, and sets iterations to be zero. Control then continues to block 1106 where display-object manager 199 checks that the item-count is less than or equal to the maximum number-of-lines to be displayed. If the check at block 1106 is true, display-object manager 199 displays the compressed nodes at block 1126 and returns at block 1128. If the check at block 1106 is false, then display-object manager 199 at block 1108 compresses the list as further described under the description for FIG. 13.

Control then continues to block 1109, where display-object manager 199 sets the number-of-lines to be displayed to the number of display structures 510 and increments iterations. Control then continues to block 1110, where display-object manager 199 checks if the number-of-lines to be displayed is less than or equal to the maximum number-of-lines to be displayed and if the number-of-lines to be displayed is greater than the maximum number of lines to be displayed multiplied by a value of 0.9 or if iterations is greater than the maximum number of iterations, which is a predetermined constant. The value of 0.9 was chosen as a predetermined constant, in the preferred embodiment, to force the cycle of bringing the number of display structures to be less than or equal to the maximum number of lines on a screen to converge. If the check at block 1110 is true, then display-object manager 199 continues to block 1126.

If the check at block 1110 is false, display-object manager 199 continues to block 1112, where it checks if the number of lines to be displayed is greater than the maximum number of lines to be displayed. If the check at block 1112 is true, then display-object manager 199 continues to block 1120 where it checks if the current-threshold is less than the maximum-threshold. If the check at block 1120 is false, display-object manager 199 continues to block 1124, where it sets the current-threshold to be the maximum-threshold multiplied by (one minus the maximum number-of-lines to be displayed divided by the number-of-lines to be displayed). Control then returns to block 1108. If the check at block 1120 is true, display-object manager 199 continues to block 1122, where it sets the maximum-threshold to be the current-threshold and continues to block 1124.

If the check at block 1112 was false, display-object manager 199 continues to block 1114, where it checks if the minimum-threshold is less than or equal to the current-threshold. If the check at block 1114 is true, display-object manager 199 continues to block 1126. If the check at block 1114 is false, display-object manager 199 continues to block 1116, where it sets the minimum-threshold to be the current-threshold and then continues to block 1118, where it sets the current-threshold to be the minimum-threshold multiplied by (0.9 minus the number of lines divided by the maximum number of line). Control then returns to block 1108.

Figure 16:
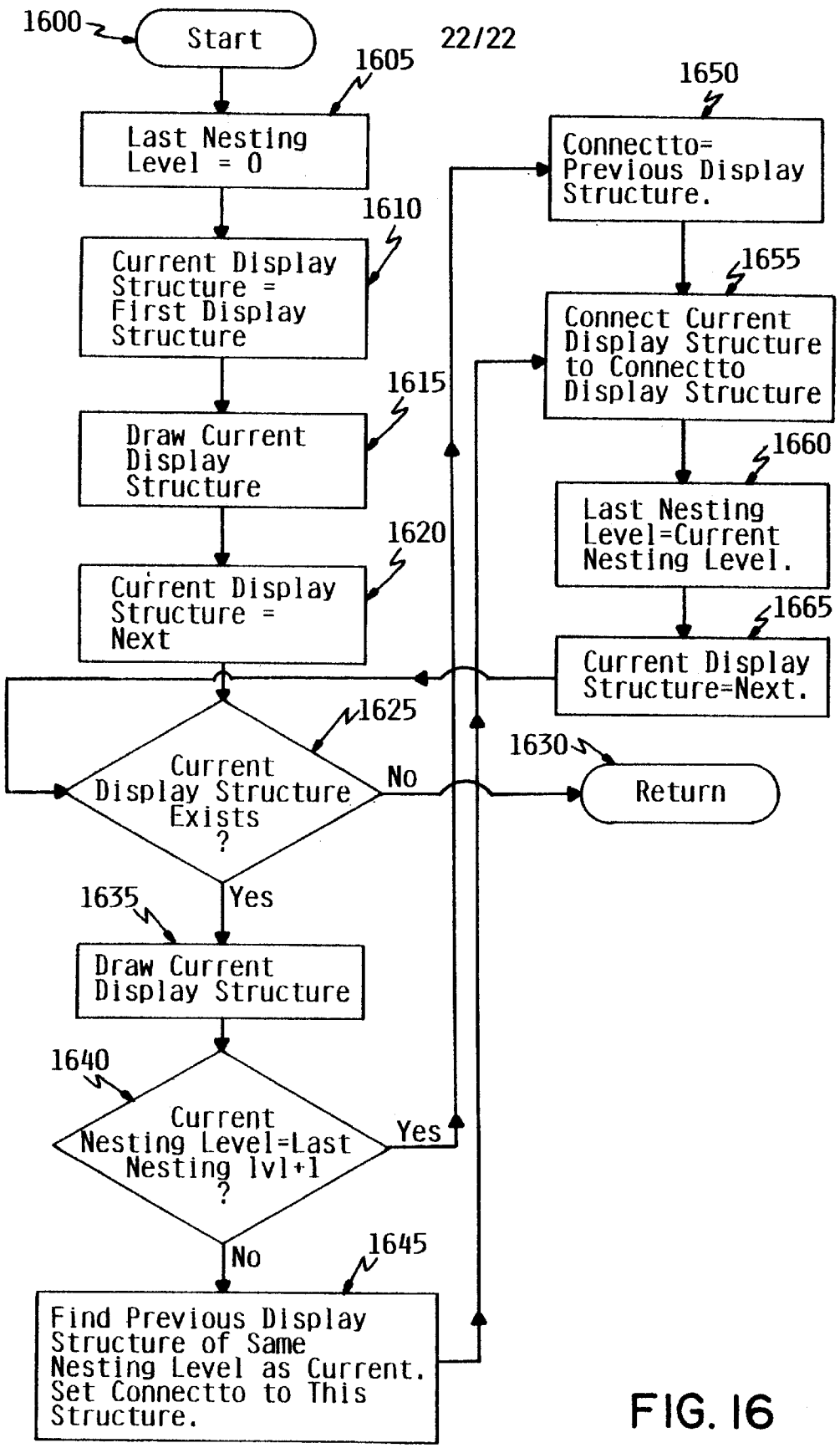

Referring to FIG. 16, there is illustrated logic that displays the data structures on display device 114. For example, this logic can create the hierarchical tree view shown in FIGS. 4 and 5 from the data structures illustrated in FIGS. 7, 8, 9, and 10. Referring again to FIG. 16, at block 1600, control starts. At block 1605, display-object manager 199 initializes the last nesting level to be zero. Control then continues to block 1610 where display-object manager 199 sets the current display structure to be the first display structure. For example, in FIG. 8 the first display structure is display structure 510a. Referring again to FIG. 16, control then continues to block 1615 where display-object manager draws the current display structure on display screen 114. In the preferred embodiment, this draw function displays description 511, an icon identifying the object being displayed, a "+" or "−", and puts these displayed items at the correct nesting level of the tree structure pointed to by the current display structure. Control then continues to block 1620, where display-object manager sets the current display structure to be the next display structure in the list. In the example of FIG. 8, this would be display structure 510b.

Control then continues to block 1625 where display-object manager determines whether the current display structure exists. If the current display structure does not exist, then display-object manager returns from this logic at block 1630. If the current display structure does exist, then control continues to block 1635 where display-object manager draws the current display structure as previously described under the description for block 1615. Control then continues to block 1640 where display-object manager determines whether the current nesting level is equal to the last nesting level plus one. If the current nesting level is equal to the last nesting level plus one then control continues to block 1650 where display-object manager 199 sets the variable "connect to" equal to the previous display structure. Control then continues to block 1655. But, if the current nesting level is not equal to the last nesting level plus one, then control continues to block 1645 where display-object manager searches for the previous display structure of the same nesting level as the current display structure. When display-object manager 199 define the previous display structure of the same nesting level as the current display structure, it sets the variable "connect to" to be this found display structure. Control then continues to block 1655.

At block 1655, display-object manager draws a connecting line that connects the current display structure to the "connect to" display structure on display screen 114. Control then continues to block 1660 where display-object manager sets the last nesting level to be the current nesting level. Control then continues to block 1665 where display-object manager sets the current display structure to be the next display structure in the list. Control then returns to block 1625.

While this invention has been described with respect to the preferred and alternative embodiments, it will be understood by those skilled in the art that various changes in detail may be made therein without departing from the spirit, scope, and teaching of the invention. For example, compressed lists may become widely employed in consumer applications such as operator panels for consumer electronics, appliances, and automobiles. In addition, although the preferred embodiment has been described in the context of objects within directories, the invention applies equally well to any non-directory objects that may be advantageously displayed in a hierarchy, for example, a business organization chart or a library of books organized by subject, author, or title. Accordingly, the herein disclosed invention is to be limited only as specified in the following claims.

What is claimed is:

1. A method for managing a display of a plurality of object identifiers on a display screen, comprising:

displaying the plurality of object identifiers on the display screen;

selecting a subset of the plurality of object identifiers, wherein the subset comprises at least a first object identifier and a last object identifier, wherein the plurality of object identifiers are organized in a tree structure, the first object identifier and the last object identifier are siblings in the tree structure, the siblings have a parent object, and wherein the subset contains less than all the parent object's children; and replacing the display of the subset with a new identifier, wherein the new identifier comprises the first object identifier and the last object identifier.

2. The method of claim 1, wherein the new identifier further comprises a number of object identifiers in the subset.

3. The method of claim 1, wherein the first object identifier was nearest the top of the displayed subset and the last object identifier was nearest the bottom of the displayed subset.

4. The method of claim 1, wherein the selecting step further comprises selecting the subset so that the display of the entire tree structure will fit on the display.

5. The method of claim 1, wherein the selecting step further comprises selecting the subset based on creation date of the plurality of objects.

6. The method of claim 1, wherein the selecting step further comprises selecting the subset based on change date of the plurality of objects.

7. The method of claim 1, wherein the selecting step further comprises selecting he subset based on access date of the plurality of objects.

8. The method of claim 1, wherein the selecting step further comprises selecting the subset based on size of the plurality of objects.

9. The method of claim 1, wherein the selecting step further comprises selecting the subset based on access frequency of the plurality of objects.

10. The method of claim 1, wherein the selecting step further comprises selecting the subset based on an item defined by a user.

11. The method of claim 1, further comprising replacing the new identifier with the subset.

12. A method for managing a display of a plurality of object identifiers on a display screen, wherein the plurality of object identifiers are organized in a tree structure, and wherein the plurality of object identifiers represent a plurality of objects comprising:

displaying the plurality of object identifiers on the display screen;

selecting a subset of the plurality of object identifiers, wherein all object identifiers in the subset are siblings, wherein the siblings have a parent object, and wherein the subset contains less than all of the parent object's children; and replacing the display of the subset with a new identifier.

13. The method of claim 12, wherein the new identifier further comprises a count of the number of objects in the subset.

14. The method of claim 12, wherein the new identifier further comprises a first object identifier and a last object identifier, wherein the first and second object identifiers are members of the subset.

15. The method of claim 12, wherein the first object identifier was nearest the top of the displayed subset and the last object identifier was nearest the bottom of the displayed subset.

16. The method of claim 12, wherein the selecting step further comprises selecting the subset so that the display of the entire tree structure will fit on the display.

17. The method of claim 12, wherein the selecting step further comprises selecting the subset based on creation date of the plurality of objects.

18. The method of claim 12, wherein the selecting step further comprises selecting the subset based on change date of the plurality of objects.

19. The method of claim 12, wherein the selecting step further comprises selecting the subset based on access date of the plurality of objects.

20. The method of claim 12, wherein the selecting step further comprises selecting the subset based on size of the plurality of objects.

21. The method of claim 12, wherein the selecting step further comprises selecting the subset based on access frequency of the plurality of objects.

22. The method of claim 12, wherein the selecting step further comprises selecting the subset based on an item defined by a user.

23. The method of claim 12, further comprising replacing the new identifier with the subset.

24. An apparatus that manages a display of a plurality of object identifiers on a display screen, wherein the plurality of object identifiers are organized in a tree structure, and wherein the plurality of object identifiers represent a plurality of objects comprising:

a display-object manager that displays the plurality of object identifiers on the display screen, selects a subset of the plurality of object identifiers, wherein all object identifiers in the subset are siblings, wherein the siblings have a parent object, and wherein the subset contains less than all of the parent object's children, and replaces the display of the subset with a new identifier.

25. The apparatus of claim 24, wherein the new identifier further comprises a count of the number of objects in the subset.

26. The apparatus of claim 24, wherein the new identifier further comprises a first object identifier and a last object identifier, wherein the first and second object identifiers are members of the subset.

27. The apparatus of claim 24, wherein the first object identifier was nearest the top of the displayed subset and the last object identifier was nearest the bottom of the displayed subset.

28. The apparatus of claim 24, wherein the display-object manager step further selects the subset so that the display of the entire tree structure will fit on the display.

29. The apparatus of claim 24, wherein the display-object manager further selects the subset based on creation date of the plurality of objects.

30. The apparatus of claim 24, wherein the display-object manager further selects the subset based on change date of the plurality of objects.

31. The apparatus of claim 24, wherein the display-object manager selects the subset based on access date of the plurality of objects.

32. The apparatus of claim 24, wherein the display-object manager further selects the subset based on size of the plurality of objects.

33. The apparatus of claim 24, wherein the display-object manager further selects the subset based on access frequency of the plurality of objects.

34. The apparatus of claim 24, wherein the display-object manager further selects the subset based on an item defined by a user.

35. The apparatus of claim 24, wherein the display-object manager further replaces the new identifier with the subset.

36. An program product that manages a display of a plurality of object identifiers on a display screen, wherein the plurality of object identifiers are organized in a tree structure, and wherein the plurality of object identifiers represent a plurality of objects comprising:

a display-object manager that displays the plurality of object identifiers on the display screen, selects a subset of the plurality of object identifiers, wherein all object identifiers in the subset are siblings, wherein the siblings have a parent object, and wherein the subset contains less than all of the parent object's children, and replaces the display of the subset with a new identifier; and signal-bearing media bearing the display-object manager.

37. The program product of claim 36, wherein the new identifier further comprises a count of the number of objects in the subset.

38. The program product of claim 36, wherein the new identifier further comprises a first object identifier and a last object identifier, wherein the first and second object identifiers are members of the subset.

39. The program product of claim 36, wherein the first object identifier was nearest the top of the displayed subset and the last object identifier was nearest the bottom of the displayed subset.

40. The program product of claim 36, wherein the display-object manager step further selects the subset so that the display of the entire tree structure will fit on the display.

41. The program product of claim 36, wherein the display-object manager further selects the subset based on creation date of the plurality of objects.

42. The program product of claim 36, wherein the display-object manager further selects the subset based on change date of the plurality of objects.

43. The program product of claim 36, wherein the display-object manager selects the subset based on access date of the plurality of objects.

44. The program product of claim 36, wherein the display-object manager further selects the subset based on size of the plurality of objects.

45. The program product of claim 36, wherein the display-object manager further selects the subset based on access frequency of the plurality of objects.

46. The program product of claim 36, wherein the display-object manager further selects the subset based on an item defined by a user.

47. The program product of claim 36, wherein the display-object manager further replaces the new identifier with the subset.

* * * * *

UNITED STATES PATENT AND TRADEMARK OFFICE
CERTIFICATE OF CORRECTION

PATENT NO.  : 5,953,017

DATED       : Sep. 14, 1999

INVENTOR(S) : Mark John Beach and Brian John Cragun

It is certified that error appears in the above-identified patent and that said Letters Patent is hereby corrected as shown below:

Claim 7, Col. 18, Line 26, "he" should be --the--.

Signed and Sealed this

Seventh Day of March, 2000

Attest:

Attesting Officer

Q. TODD DICKINSON

Commissioner of Patents and Trademarks